US006754815B1

(12) United States Patent
Ellison et al.

(10) Patent No.: US 6,754,815 B1
(45) Date of Patent: Jun. 22, 2004

(54) METHOD AND SYSTEM FOR SCRUBBING AN ISOLATED AREA OF MEMORY AFTER RESET OF A PROCESSOR OPERATING IN ISOLATED EXECUTION MODE IF A CLEANUP FLAG IS SET

(75) Inventors: Carl M. Ellison, Portland, OR (US); Roger A. Golliver, Beaverton, OR (US); Howard C. Herbert, Phoenix, AZ (US); Derrick C. Lin, San Mateo, CA (US); Francis X. McKeen, Portland, OR (US); Gilbert Neiger, Portland, OR (US); Ken Reneris, Wilbraham, MA (US); James A. Sutton, Portland, OR (US); Shreekant S. Thakkar, Portland, OR (US); Millind Mittal, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 503 days.

(21) Appl. No.: 09/618,659

(22) Filed: Jul. 18, 2000

Related U.S. Application Data
(60) Provisional application No. 60/198,227, filed on Mar. 31, 2000.

(51) Int. Cl.$^7$ .............................................. G06F 15/177
(52) U.S. Cl. ................................................ 713/1; 713/2
(58) Field of Search .............................. 713/1, 2, 100, 713/193, 200; 710/105, 107, 305; 705/54, 57

(56) References Cited

U.S. PATENT DOCUMENTS

| | | |
|---|---|---|
| 4,037,214 A | 7/1977 | Birney |
| 4,162,536 A | 7/1979 | Morley |

(List continued on next page.)

FOREIGN PATENT DOCUMENTS

| | | |
|---|---|---|
| EP | 0473913 | 3/1992 |
| EP | 0600112 | 8/1994 |

(List continued on next page.)

OTHER PUBLICATIONS

"Information Display Technique for a Terminate Stay Resident Program." IBM Technical Disclosure Bulletin, Dec. 1, 1991, US, pp. 156–158.*

(List continued on next page.)

*Primary Examiner*—Thomas Lee
*Assistant Examiner*—Paul Yanchus, III
(74) *Attorney, Agent, or Firm*—Blakely, Sokoloff, Taylor & Zafman LLP

(57) ABSTRACT

The present invention provides a method, apparatus, and system for invoking a reset process in response to a processor being individually reset. The reset processor operates within a platform in an isolated execution mode and is associated with an isolated area of memory. An initialization process is invoked for an initializing processor. The initialization process determines whether or not a cleanup flag is set. If the cleanup flag is set, the isolated area of memory is scrubbed. In one embodiment, when a last processor operating in the platform is reset, it is reset without clearing the cleanup flag. Subsequently, an initializing processor invokes the initialization process. The initialization process determines that the cleanup flag is set. The initialization process invokes the execution of a processor nub loader. If the cleanup flag is set, the processor nub loader scrubs the isolated area of memory and invokes a controlled close for the initializing processor. The controlled close clears the cleanup flag. The initializing processor then re-performs the initialization process. Upon the second iteration of the initialization process, with the cleanup flag not set, a new isolated area of memory is created for the initializing processor.

52 Claims, 12 Drawing Sheets

U.S. PATENT DOCUMENTS

| | | | |
|---|---|---|---|
| 4,247,905 A | * | 1/1981 | Yoshida et al. ............. 711/166 |
| 4,276,594 A | | 6/1981 | Morley |
| 4,278,837 A | | 7/1981 | Best |
| 4,307,447 A | | 12/1981 | Provanzano et al. |
| 4,319,323 A | | 3/1982 | Ermolovich et al. |
| 4,366,537 A | | 12/1982 | Heller et al. |
| 4,521,852 A | | 6/1985 | Guttag |
| 4,571,672 A | | 2/1986 | Hatada et al. |
| 4,759,064 A | | 7/1988 | Chaum |
| 4,795,893 A | | 1/1989 | Ugon |
| 4,825,052 A | | 4/1989 | Chemin et al. |
| 4,907,270 A | | 3/1990 | Hazard |
| 4,907,272 A | | 3/1990 | Hazard |
| 4,910,774 A | | 3/1990 | Barakat |
| 5,007,082 A | | 4/1991 | Cummins |
| 5,022,077 A | | 6/1991 | Bealkowski et al. |
| 5,075,842 A | | 12/1991 | Lai |
| 5,079,737 A | | 1/1992 | Hackbarth |
| 5,255,379 A | | 10/1993 | Melo |
| 5,293,424 A | | 3/1994 | Holtey et al. |
| 5,317,705 A | | 5/1994 | Gannon et al. |
| 5,139,760 A | | 6/1994 | Mason et al. |
| 5,386,552 A | | 1/1995 | Garney |
| 5,421,006 A | | 5/1995 | Jablon et al. |
| 5,434,999 A | | 7/1995 | Goire et al. |
| 5,442,645 A | | 8/1995 | Ugon et al. |
| 5,455,909 A | | 10/1995 | Blomgren et al. |
| 5,459,867 A | | 10/1995 | Adams et al. |
| 5,459,869 A | | 10/1995 | Spilo |
| 5,473,692 A | | 12/1995 | Davis |
| 5,504,922 A | | 4/1996 | Seki et al. |
| 5,528,231 A | | 6/1996 | Patarin |
| 5,533,126 A | | 7/1996 | Hazard et al. |
| 5,566,323 A | | 10/1996 | Ugon |
| 5,568,552 A | | 10/1996 | Davis |
| 5,606,617 A | | 2/1997 | Brands |
| 5,615,263 A | | 3/1997 | Takahashi |
| 5,628,022 A | | 5/1997 | Ueno et al. |
| 5,657,445 A | | 8/1997 | Pearce |
| 5,717,903 A | | 2/1998 | Bonola |
| 5,720,609 A | | 2/1998 | Pfefferle |
| 5,721,222 A | | 2/1998 | Bernstein et al. |
| 5,729,760 A | | 3/1998 | Poisner |
| 5,737,604 A | * | 4/1998 | Miller et al. .................... 713/1 |
| 5,737,760 A | | 4/1998 | Grimmer |
| 5,757,919 A | | 5/1998 | Herbert |
| 5,764,969 A | | 6/1998 | Kahle et al. |
| 5,796,835 A | | 8/1998 | Saada |
| 5,796,845 A | | 8/1998 | Serikawa et al. |
| 5,805,712 A | | 9/1998 | Davis |
| 5,825,875 A | | 10/1998 | Ugon |
| 5,835,594 A | | 11/1998 | Albrecht et al. |
| 5,844,986 A | | 12/1998 | Davis |
| 5,852,717 A | | 12/1998 | Bhide |
| 5,867,577 A | | 2/1999 | Patarin |
| 5,872,994 A | | 2/1999 | Akiyama et al. |
| 5,890,189 A | | 3/1999 | Nozue et al. |
| 5,900,606 A | | 5/1999 | Rigal |
| 5,901,225 A | | 5/1999 | Ireton et al. |
| 5,903,752 A | | 5/1999 | Dingwall et al. |
| 5,937,063 A | | 8/1999 | Davis |
| 5,953,502 A | | 9/1999 | Helbig, Sr. |
| 5,970,147 A | | 10/1999 | Davis et al. |
| 5,978,481 A | | 11/1999 | Ganesan et al. |
| 5,987,557 A | | 11/1999 | Ebrahim |
| 6,014,745 A | | 1/2000 | Ashe |
| 6,055,637 A | | 4/2000 | Hudson et al. |
| 6,058,478 A | | 5/2000 | Davis |
| 6,061,794 A | | 5/2000 | Angelo |
| 6,085,296 A | | 7/2000 | Karkhanis et al. |
| 6,092,095 A | | 7/2000 | Maytal |
| 6,101,584 A | | 8/2000 | Satou et al. |
| 6,115,816 A | | 9/2000 | Davis |
| 6,125,430 A | | 9/2000 | Noel et al. |
| 6,148,379 A | | 11/2000 | Schimmel |
| 6,158,546 A | | 12/2000 | Hanson et al. |
| 6,175,925 B1 | | 1/2001 | Nardone et al. |
| 6,178,509 B1 | | 1/2001 | Nardone et al. |
| 6,192,455 B1 | | 2/2001 | Bogin et al. |
| 6,205,550 B1 | | 3/2001 | Nardone et al. |
| 6,212,635 B1 | | 4/2001 | Reardon |
| 6,222,923 B1 | | 4/2001 | Schwenk |
| 6,249,872 B1 | | 6/2001 | Wildgrube et al. |
| 6,252,650 B1 | | 6/2001 | Nakamura |
| 6,269,392 B1 | | 7/2001 | Cotichini et al. |
| 6,272,533 B1 | | 8/2001 | Brown |
| 6,272,637 B1 | * | 8/2001 | Little et al. .................. 713/194 |
| 6,282,651 B1 | | 8/2001 | Ashe |
| 6,282,657 B1 | | 8/2001 | Kaplan et al. |
| 6,292,874 B1 | | 9/2001 | Barnett |
| 6,301,646 B1 | | 10/2001 | Hostetter |
| 6,308,270 B1 | | 10/2001 | Guthery et al. |
| 6,314,409 B2 | * | 11/2001 | Schneck et al. .............. 705/54 |
| 6,321,314 B1 | | 11/2001 | Van Dyke |
| 6,330,670 B1 | | 12/2001 | England et al. |
| 6,339,815 B1 | | 1/2002 | Feng |
| 6,339,816 B1 | | 1/2002 | Bausch |
| 6,357,004 B1 | | 3/2002 | Davis |
| 6,363,485 B1 | | 3/2002 | Adams |
| 6,374,286 B1 | | 4/2002 | Gee et al. |
| 6,374,317 B1 | * | 4/2002 | Ajanovic et al. ........... 710/105 |
| 6,378,072 B1 | | 4/2002 | Collins et al. |
| 6,389,537 B1 | | 5/2002 | Davis et al. |
| 6,412,035 B1 | | 6/2002 | Webber |
| 6,421,702 B1 | | 7/2002 | Gulick |
| 6,435,416 B1 | | 8/2002 | Slassi |
| 6,445,797 B1 | | 9/2002 | McGough et al. |
| 6,463,535 B1 | | 10/2002 | Drews et al. |
| 6,463,537 B1 | | 10/2002 | Tello |
| 6,499,123 B1 | | 12/2002 | McFarland et al. |
| 6,505,279 B1 | | 1/2003 | Phillips et al. |
| 6,507,904 B1 | | 1/2003 | Ellison et al. |
| 6,535,988 B1 | | 3/2003 | Poisner |
| 6,557,104 B2 | | 4/2003 | Vu et al. |
| 6,633,963 B1 | | 10/2003 | Ellison et al. |
| 6,633,981 B1 | | 10/2003 | Davis |
| 2001/0021969 A1 | | 9/2001 | Burger et al. |
| 2001/0027527 A1 | | 10/2001 | Balashov et al. |
| 2001/0037450 A1 | | 11/2001 | Metlitski et al. |

FOREIGN PATENT DOCUMENTS

| | | | |
|---|---|---|---|
| EP | 0930567 A3 | 4/2000 | |
| EP | 1 030 237 A | 8/2000 | |
| EP | 1146715 | 10/2001 | |
| JP | 2000076139 A | * 3/2000 | ........... G06F/12/14 |
| WO | WO 97/29567 | 8/1997 | |
| WO | WO 98/34365 | 8/1998 | |
| WO | WO9844402 | 10/1998 | |
| WO | WO9905600 | 2/1999 | |
| WO | WO9909482 | 2/1999 | |
| WO | WO9957863 | 11/1999 | |
| WO | WO0062232 | 10/2000 | |
| WO | WO 01/27723 A | 4/2001 | |
| WO | WO 01/27821 A | 4/2001 | |
| WO | WO 01/75565 | 10/2001 | |
| WO | WO 01/75595 A2 | 10/2001 | |

OTHER PUBLICATIONS

J. Heinrich: "MIPS R4000 Microprocessor User's Manual," Apr. 1, 1993, MIPS, MT. View, XP002184449, pp. 61–97.

"M68040 User's Manual", 1993, Motorola Inc., p. 1–13–p. 1–5–p. 1–19–p. 1–20, p. 2–1 –p. 2–3, p. 4–1, p. 8–9–p. 8–11.

"Intel 386 DX Microprocessor 32–Bit CHMOS Microprocessor with Integrated Memory Management", Dec. 31, 1995, Intel Inc., p. 32–56; figure 4–14.

Joe Heinrich:"MIPS R4000 Microprocessor User's Manual", 1994, MIPS Technology Inc., Mountain View, CA, pp. 67–79.

Berg C: "How Do I Create a Signed Applet?", Dr. Dobb's Journal, M&T Publ., Redwood City, CA, US, vol. 22, No. 8, 8 '97, p. 109–111, 122.

Gong L et al: "Going Beyond the Sandbox: An Overview of the New Security Architecture in the Java Development Kit 1.2", Proceedings of the USENIX Symposium on Internet Technologies and Systems, Montery, CA 12'97, pp. 103–112.

Goldberg, R., "Survey of virtual machine research," IEEE Computer Magazine 7(6), pp. 34–45, 1974.

Gum, P.H., "System/370 Extended Architecture: Facilities for Virtual Machines," IBM J. Research Development, Vol 27, No. 6, pp. 530–544, Nov. 1983.

Rosenblum, M. "Vmware's Virtual Platform: A Virtual Machine Monitor for Commodity PCs" Proceedings of the 11th Hotchips Conference, pp. 185–196, Aug. 1999.

Lawton, K., "Running Multiple Operating Systems Concurrently on an IA32 PC Using Virtualization Techniques," http://www.plex86.org/research/paper.txt; Nov. 29, 1999; pp. 1–31.

Brands, Stefan , "Restrictive Blinding of Secret–Key Certificates", *Springer–Verlag* XP002201306, (1995),Chapter 3.

Compaq Computer Corporation, et al., "Trusted Computing Platform Alliance (TCPA) Main Specification Version 1.1a", (Dec. 2001), 1–321.

Davida, George I., et al., "Defending Systems Against Viruses through Cryptographic Authentication", *Proceedings of the Symposium on Security and Privacy*, IEEE Comp. Soc. Press, ISBN 0–8186–1939–2, (May 1989).

Kashiwagi, Kazuhiko , et al., "Design and Implementation of Dynamically Reconstructing System Software", *Software Engineering Conference*, Proceedings 1996 Asia–Pacific Seoul, South Korea 4–7 Dec.1996, Los Alamitos, CA USA, IEEE Comput. Soc, US, ISBN 0–8186–7638–8,(1996).

Luke, Jahn , et al., "Replacement Strategy for Aging Avionics Computers", *IEEE AES Systems Magazine*, XP002190614,(Mar. 1999).

Menezes, Oorschot , "Handbook of Applied Cryptography", *CRC Press LLC, USA XP002201307*, (1997),475.

Robin, John S., et al., "Analysis of the Pentium's Ability to support a Secure Virtual Machine Monitor", *Proceedings of the 9th USENIX Security Symposium, XP002247347,Denver, Colorado*, (Aug. 14, 2000),1–17.

Saez, Sergio , et al., "A Hardware Scheduler for Complex Real–Time Systems", *Proceedings of the IEEE International Symposium on Industrial Electronics*, XP002190615, (Jul. 1999),43–48.

Sherwood, Timothy , et al., "Patchable Instruction ROM Architecture", *Department of Computer Science and Engineering, University of California, San Diego, La Jolla, CA*, (Nov. 2001).

* cited by examiner

METHOD AND SYSTEM FOR SCRUBBING AN ISOLATED AREA OF MEMORY AFTER RESET OF A PROCESSOR OPERATING IN ISOLATED EXECUTION MODE IF A CLEANUP FLAG IS SET

RELATED APPLICATION

This application claims the benefit U.S. Provisional Patent Application No. 60/198,227 filed on Mar. 31, 2000.

BACKGROUND

1. Field of the Invention

This invention relates to microprocessors. In particular, the invention relates to processor security.

2. Description of Related Art

Advances in microprocessor and communication technologies have opened up many opportunities for applications that go beyond the traditional ways of doing business. Electronic commerce (E-commerce) and business-to-business (B2B) transactions are now becoming popular and are conducted throughout global markets at continuously increasing rates. Unfortunately, while modem microprocessor systems provide users convenient and efficient methods of doing business, communicating and transacting, they are also vulnerable for unscrupulous attacks. Examples of these attacks include virus, intrusion, security breach, and tampering, to name a few. Computer security, therefore, is becoming more and more important to protect the integrity of the computer systems and increase the trust of users.

Threats caused by unscrupulous attacks may be in a number of forms. An invasive remote-launched attack by hackers may disrupt the normal operation of a system connected to thousands or even millions of users. A virus program may corrupt code and/or data of a single-user platform.

Existing techniques to protect against attacks have a number of drawbacks. Anti-virus programs can only scan and detect known viruses. Security co-processors or smart cards using cryptographic or other security techniques have limitations in speed performance, memory capacity, and flexibility. Further, redesigning operating systems creates software compatibility issues and requires tremendous investment in development efforts.

BRIEF DESCRIPTION OF THE DRAWINGS

The features and advantages of the present invention will become apparent from the following detailed description of the present invention in which.

DESCRIPTION

Figure 1A:
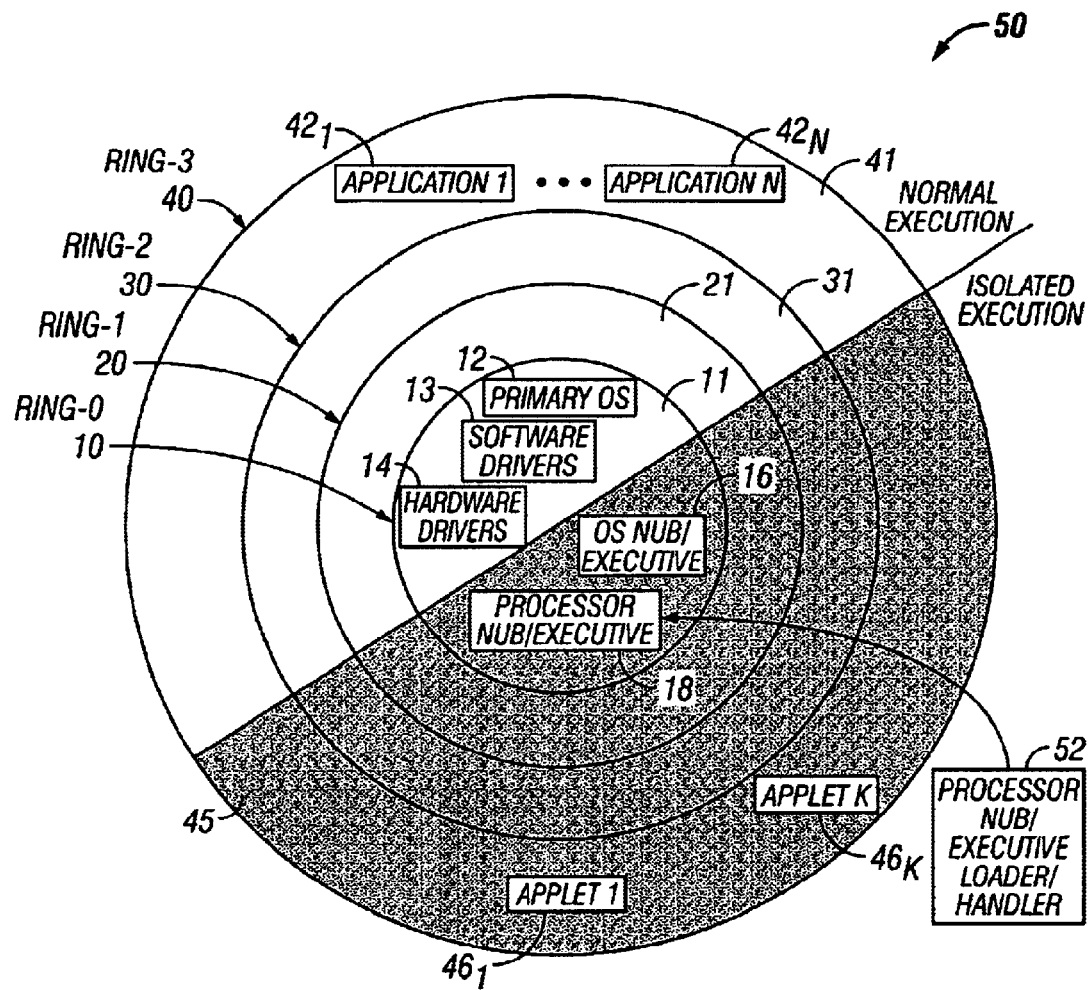
FIG. 1A is a diagram illustrating a logical operating architecture according to one embodiment of the invention.

The present invention is a method, apparatus, and system that preserves the integrity and security of an isolated execution environment and associated isolated memory area, even if one or more processors in the system are individually reset, without the entire system being reset. In such a case, it would be possible to remove the protection around the isolated memory area, thus allowing direct access from a reset processor that no longer recognized the area as protected, with the potential to expose sensitive information to a hacker.

This invention preserves the isolated area protections, even after one or more processors are individually reset, and allows an orphaned isolated memory area to be scrubbed clean before it is exposed to processors running in the normal (non-isolated) execution environment.

According to one embodiment of the present invention, a processor invokes a reset process in response to being individually reset. The reset processor operates within a platform in an isolated execution mode and, as previously discussed, is associated with an isolated area of memory. An initialization process is invoked for an initializing processor. It is determined whether a cleanup flag is set. If the cleanup flag is set, the orphaned isolated area of memory is scrubbed.

In one embodiment, a last processor operating in the system is individually reset without clearing a cleanup flag, leaving behind an orphaned isolated area. It should be noted that the present invention relates to a processor being individually reset. Thus, in a multi-processor system, a reset may be applied individually to one or more processors, while leaving the remainder of the other processors of the system untouched. In one embodiment, an input pin of a processor may be used to affect the reset. This is opposed to a "system reset" where all of the processors are simultaneously reset.

After a last processor operating in the system is individually reset, without clearing the cleanup flag, a subsequent initializing processor invokes an initialization process. The initialization process determines that the cleanup flag is set. The initialization process then reads isolated range values from an Input/Output Controller Hub (ICH) that define the isolated area of memory associated with the last reset processor. The initializing processor then sets its internal isolated range values to those of the ICH and causes a processor nub loader to be copied into the isolated area of memory. The initialization process invokes the execution of the processor nub loader. If the cleanup flag is set, the processor nub loader scrubs the orphaned isolated area of memory and invokes a controlled close for the initializing processor. The controlled close clears the cleanup flag. The initializing processor then re-performs the initialization process.

Upon the second iteration of the initialization process, with the cleanup flag not set, a new isolated area of memory is created for the initializing processor. New isolated range values are set for the initializing processor, the ICH, and a Memory Controller Hub (MCH) corresponding to the new isolated area of memory. The initialization process causes the processor nub loader to be copied into the new isolated area of memory. The processor nub loader loads the processor nub and resets the cleanup flag. The processor nub initializes a trusted subsystem for the new isolated area of memory and the initializing processor.

Thus, when a last processor is reset due to some hardware event, such as an attack by hackers, and sensitive information may be left behind in the isolated area of memory, the cleanup flag is not cleared. When an initializing processor is initialized, the initialization process determines that the cleanup flag is set. The initialization process for the initializing processor scrubs the isolated area of memory, invokes a controlled close, and then re-performs the initialization process such that the initializing processor is initialized with a clean isolated area of memory and a trusted subsystem. Advantageously, any sensitive information left behind in the previous isolated area of memory has been scrubbed so that it is inaccessible.

In the following description various embodiments of the present invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known electrical structures and circuits, are shown in block diagram m form in order not to obscure the present invention.

ARCHITECTURE OVERVIEW

One principle for providing security in a computer system or platform is the concept of an isolated execution architecture. The isolated execution architecture includes logical and physical definitions of hardware and software components that interact directly or indirectly with an operating system of the computer system or platform. An operating system and the processor may have several levels of hierarchy, referred to as rings, corresponding to various operational modes. A ring is a logical division of hardware and software components that are designed to perform dedicated tasks within the operating system. The division is typically based on the degree or level of privilege, namely, the ability to make changes to the platform. For example, a ring-0 is the innermost ring, being at the highest level of the hierarchy. Ring-0 encompasses the most critical, privileged components. In addition, modules in ring-0 can also access lesser-privileged data (i.e. at higher numbered rings), but not vice versa. Ring-3 is the outermost ring, being at the lowest level of the hierarchy. Ring-3 typically encompasses users or applications level and has the least privilege. Ring-1 and ring-2 represent the intermediate rings with decreasing levels of privilege.

FIG. 1A is a diagram illustrating a logical operating architecture 50 according to one embodiment of the invention. The logical operating architecture 50 is an abstraction of the components of an operating system and the processor. The logical operating architecture 50 includes ring-0 10, ring-1 20, ring-2 30, ring-3 40, and a processor nub loader 52. The processor nub loader 52 is an instance of an processor executive (PE) handler. The PE handler is used to handle and/or manage a processor executive (PE). The logical operating architecture 50 has two modes of operation: normal execution mode and isolated execution mode. Each ring in the logical operating architecture 50 can operate in both modes. The processor nub loader 52 operates only in the isolated execution mode.

Ring-0 10 includes two portions: a normal execution Ring-0 11 and an isolated execution Ring-0 15. The normal execution Ring-0 11 includes software modules that are critical for the operating system, usually referred to as kernel. These software modules include a primary operating system (e.g., kernel) 12, software drivers 13, and hardware drivers 14. The isolated execution Ring-0 15 includes an operating system (OS) nub 16 and a processor nub 18. The OS nub 16 and the processor nub 18 are instances of an OS executive (OSE) and processor executive (PE), respectively. The OSE and the PE are part of executive entities that operate in a protected environment associated with the isolated area 70 and the isolated execution mode. The processor nub loader 52 is a protected bootstrap loader code held within a chipset in the system and is responsible for loading the processor nub 18 from the processor or chipset into an isolated area as will be explained later.

Similarly, ring-1 20, ring-2 30, and ring-3 40 include normal execution ring-1 21, ring-2 31, ring-3 41, and isolated execution ring-1 25, ring-2 35, and ring-3 45, respectively. In particular, normal execution ring-3 includes N applications $42_1$ to $42_N$ and isolated execution ring-3 includes K applets $46_1$ to $46_K$.

One concept of the isolated execution architecture is the creation of an isolated region in the system memory, referred to as an isolated area, which is protected by both the processor and chipset in the computer system. The isolated region may also be in cache memory, protected by a translation look aside buffer (TLB) access check.

Access to this isolated region is permitted only from a front side bus (FSB) of the processor, using special bus (e.g., memory read and write) cycles, referred to as isolated read and write cycles. The special bus cycles are also used for snooping. The isolated read and write cycles are issued by the processor executing in an isolated execution mode. The isolated execution mode is initialized using a privileged instruction in the processor, combined with the processor nub loader 52. The processor nub loader 52 verifies and loads a ring-0 nub software module (e.g., processor nub 18) into the isolated area. The processor nub 18 provides hardware-related services for the isolated execution.

One task of the processor nub 18 is to verify and load the ring-0 OS nub 16 into the isolated area. A second task of the processor nub 18 is to generate the root of a key hierarchy unique to a combination of the platform, the processor nub 18, and the operating system nub 16. The operating system nub 16 provides links to services in the primary OS 12 (e.g., the unprotected segments of the operating system), provides page management within the isolated area, and has the responsibility for loading ring-3 application modules 45, including applets $46_1$ to $46_K$, into protected pages allocated in the isolated area. The operating system nub 16 may also load ring-0 supporting modules.

The operating system nub 16 may choose to support paging of data between the isolated area and ordinary (e.g., non-isolated) memory. If so, then the operating system nub 16 is also responsible for encrypting and hashing the isolated area pages before evicting the page to the ordinary memory, and for checking the page contents upon restoration of the page. The isolated mode applets $46_1$ to $46_K$ and their data are tamper-resistant and monitor-resistant from all software attacks from other applets, as well as from non-isolated-space applications (e.g., $42_1$ to $42_N$), dynamic link libraries (DLLs), drivers and even the primary operating system 12. Only the processor nub 18 or the operating system nub 16 can interfere with or monitor the applet's execution.

Figure 1B:
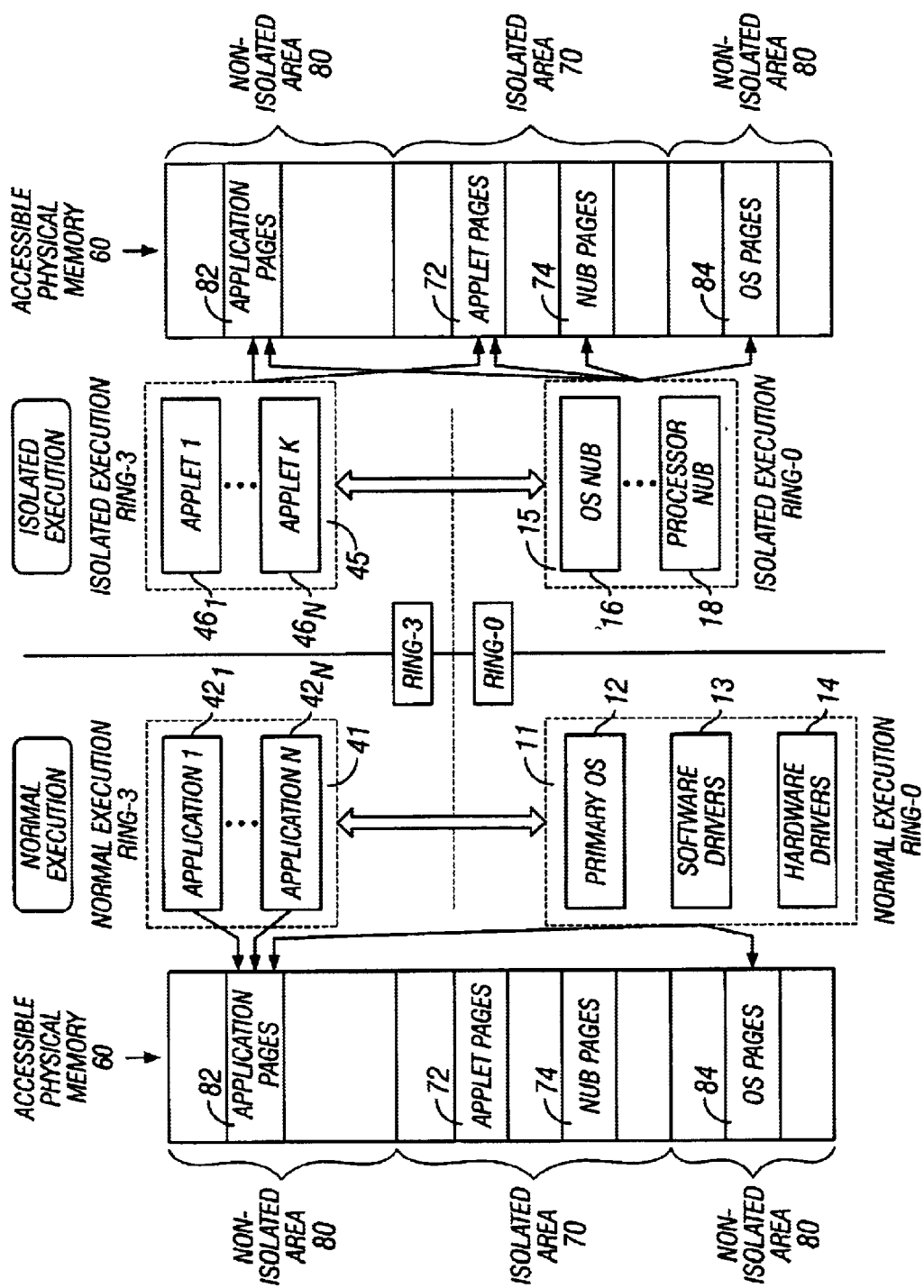
FIG. 1B is a diagram illustrating the accessibility of various elements in the operating system and the processor according to one embodiment of the invention.

FIG. 1B is a diagram illustrating accessibility of various elements in the operating system 10 and the processor according to one embodiment of the invention. For illustration purposes, only elements of ring-0 10 and ring-3 40 are shown. The various elements in the logical operating architecture 50 access an accessible physical memory 60 according to their ring hierarchy and the execution mode.

The accessible physical memory 60 includes an isolated area 70 and a non-isolated area 80. The isolated area 70 includes applet pages 72 and nub pages 74. The non-isolated area 80 includes application pages 82 and operating system pages 84. The isolated area 70 is accessible only to elements of the operating system and processor operating in isolated execution mode. The non-isolated area 80 is accessible to all elements of the ring-0 operating system and processor.

The normal execution ring-0 11 including the primary OS 12, the software drivers 13, and the hardware drivers 14, can access both the OS pages 84 and the application pages 82. The normal execution ring-3, including applications $42_1$ to $42_N$, can access only to the application pages 82. Both the normal execution ring-0 11 and ring-3 41, however, cannot access the isolated area 70.

The isolated execution ring-0 15, including the OS nub 16 and the processor nub 18, can access to both of the isolated area 70, including the applet pages 72 and the nub pages 74, and the non-isolated area 80, including the application pages 82 and the OS pages 84. The isolated execution ring-3 45, including applets $46_1$ to $46_K$, can access only to the application pages 82 and the applet pages 72. The applets $46_1$ to $46_K$ reside in the isolated area 70.

Figure 1C:
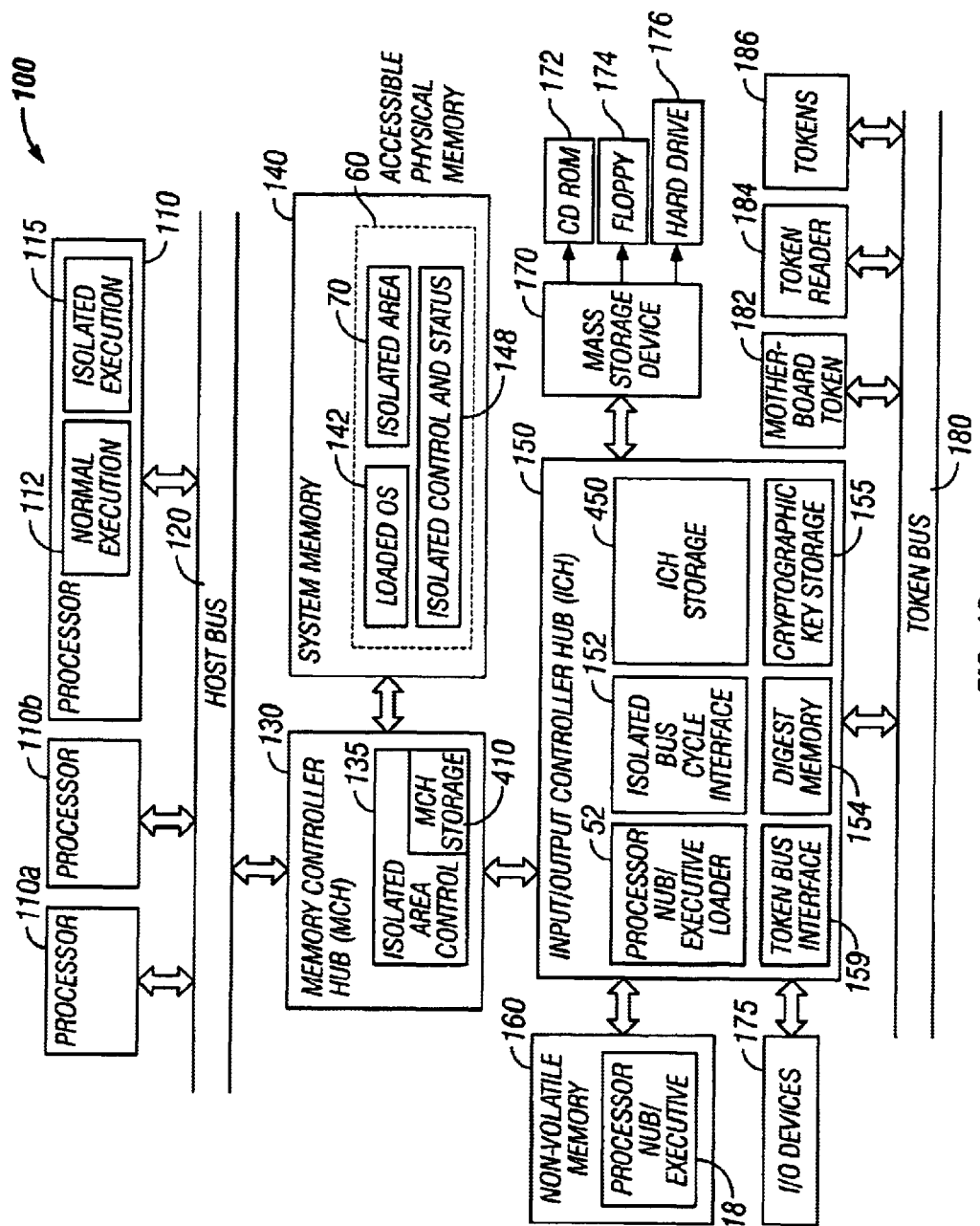
FIG. 1C is a diagram illustrating a computer system in which one embodiment of the invention can be practiced.

FIG. 1C is a diagram illustrating a computer system 100 in which one embodiment of the invention can be practiced. The computer system 100 includes a processor 110, a host bus 120, a memory controller hub (MCH) 130, a system memory 140, an input/output controller hub (ICH) 150, a non-volatile memory, or system flash, 160, a mass storage device 170, input/output devices 175, a token bus 180, a motherboard (MB) token 182, a reader 184, and a token 186. The MCH 130 may be integrated into a chipset that integrates multiple functionalities such as the isolated execution mode, host-to-peripheral bus interface, memory control. Similarly, the ICH 150 may also be integrated into a chipset together or separate from the MCH 130 to perform I/O functions. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The processor 110 represents a central processing unit of any type of architecture, such as complex instruction set computers (CISC), reduced instruction set computers (RISC), very long instruction word (VLIW), or hybrid architecture. In one embodiment, the processor 110 is compatible with an Intel Architecture (IA) processor, such as the Pentium™ series, the IA-32™ and the IA-64™. The processor 110 includes a normal execution mode 112 and an isolated execution circuit 115. The normal execution mode 112 is the mode in which the processor 110 operates in a non-protected environment, or a normal environment without the security features provided by the isolated execution mode. The isolated execution circuit 115 provides a mechanism to allow the processor 110 to operate in an isolated execution mode. The isolated execution circuit 115 provides hardware and software support for the isolated execution mode. This support includes configuration for isolated execution, definition of an isolated area, definition (e.g., decoding and execution) of isolated instructions, generation of isolated access bus cycles, and generation of isolated mode interrupts.

In one embodiment, the computer system 100 can be a single processor system, such as a desktop computer, which has only one main central processing unit, e.g. processor 110. In other embodiments, the computer system 100 can include multiple processors, e.g. processors 110, 110a, 110b, etc., as shown in FIG. 1C. Thus, the computer system 100 can be a multi-processor computer system having any number of processors. For example, the multi-processor computer system 100 can operate as part of a server or workstation environment. The basic description and operation of processor 110 will be discussed in detail below. It will be appreciated by those skilled in the art that the basic description and operation of processor 110 applies to the other processors 110a and 110b, shown in FIG. 1C, as well as any number of other processors that may be utilized in the multi-processor computer system 100 according to one embodiment of the present invention.

The host bus 120 provides interface signals to allow the processor 110 or processors 110, 100a, and 110b to communicate with other processors or devices, e.g., the MCH 130. In addition to normal mode, the host bus 120 provides an isolated access bus mode with corresponding interface signals for memory read and write cycles when the processor 110 is configured in the isolated execution mode. The isolated access bus mode is asserted on memory accesses initiated while the processor 110 is in the isolated execution mode. The isolated access bus mode is also asserted on instruction pre-fetch and cache write-back cycles if the address is within the isolated area address range and the processor 110 is initialized in the isolated execution mode. The processor 110 responds to snoop cycles to a cached address within the isolated area address range if the isolated access bus cycle is asserted and the processor 110 is initialized into the isolated execution mode.

The MCH 130 provides control and configuration of memory and input/output devices such as the system memory 140 and the ICH 150. The MCH 130 provides interface circuits to recognize and service isolated access assertions on memory reference bus cycles, including isolated memory read and write cycles. In addition, the MCH 130 has an MCH storage 410 as part of an Isolated Area Control 135 which stores isolated range values utilizing memory range registers (e.g., base and length registers) to represent the isolated area in the system memory 140. Once configured, the MCH 130 aborts any access to the isolated area that does not have the isolated access bus mode asserted.

The system memory 140 stores system code and data. The system memory 140 is typically implemented with dynamic random access memory (DRAM) or static random access memory (SRAM). The system memory 140 includes the accessible physical memory 60 (shown in FIG. 1B). The accessible physical memory includes a loaded operating system $142_1$ the isolated area 70 (shown in FIG. 1B), and an isolated control and status space 148. The loaded operating system 142 is the portion of the operating system that is loaded into the system memory 140. The loaded OS 142 is typically loaded from a mass storage device via some boot code in a boot storage such as a boot read only memory (ROM). The isolated area 70, as shown in FIG. 1B, is the memory area that is defined by the processor 110 when operating in the isolated execution mode. Access to the isolated area 70 is restricted and is enforced by the processor 110 and/or the MCH 130 or other chipset that integrates the isolated area functionalities. The isolated control and status space 148 is an input/output (I/O)-like, independent address space defined by the processor 110 and/or the MCH 130. The isolated control and status space 148 contains mainly the isolated execution control and status registers. The isolated control and status space 148 does not overlap any existing address space and is accessed using the isolated bus cycles. The system memory 140 may also include other programs or data which are not shown.

The ICH 150 represents a known single point in the system having the isolated execution functionality. For clarity, only one ICH 150 is shown. The system 100 may have many ICH's similar to the ICH 150. When there are multiple ICH's, a designated ICH is selected to control the isolated area configuration and status. In one embodiment, this selection is performed by an external strapping pin. As is known by one skilled in the art, other methods of selecting can be used, including using programmable configuring registers. The ICH 150 has a number of functionalities that are designed to support the isolated execution mode in addition to the traditional I/O functions. In particular, the ICH 150 includes an isolated bus cycle interface 152, the processor nub loader 52 (shown in FIG. 1A), a digest memory 154, a cryptographic key storage 155, an ICH storage 450 (to be discussed later), and a token bus interface 159.

The isolated bus cycle interface 152 includes circuitry to interface to the isolated bus cycle signals to recognize and service isolated bus cycles, such as the isolated read and write bus cycles. The processor nub loader 52, as shown in FIG. 1A, includes a processor nub loader code and its digest (e.g., hash) value. The processor nub loader 52 is invoked by execution of an appropriated isolated instruction (e.g., isolated initialization instruction (Iso-Init)) and is transferred to the isolated area 70. From the isolated area 70, the processor nub loader 52 copies the processor nub 18 from the system flash (e.g., the processor nub code 18 in non-volatile memory 160) into the isolated area 70, verifies and logs its integrity, and manages a symmetric key used to protect the processor nub's secrets. In one embodiment, the processor nub loader 52 is implemented in read only memory (ROM). For security purposes, the processor nub loader 52 is unchanging, tamper-resistant and non- substitutable. The digest memory 154, typically implemented in RAM, stores the digest (e.g., hash) values of the loaded processor nub 18, the operating system nub 16, and any other critical modules (e.g., ring-0 modules) loaded into the isolated execution space.

The cryptographic key storage 155 holds a symmetric encryption/decryption key that is unique for the platform of the system 100. In one embodiment, the cryptographic key storage 155 includes internal fuses that are programmed at manufacturing. Alternatively, the cryptographic key storage 155 may also be created with a random number generator and a strap of a pin. The isolated execution logical processing manager 156 manages the operation of logical processors operating in isolated execution mode. In one embodiment, the isolated execution logical processing manager 156 includes a logical processor count register that tracks the number of logical processors participating in the isolated execution mode. The token bus interface 159 interfaces to the token bus 180. A combination of the processor nub loader digest, the processor nub digest, the operating system nub digest, and optionally additional digests, represents the overall isolated execution digest, referred to as isolated digest. The isolated digest is a fingerprint identifying the ring-0 code controlling the isolated execution configuration and operation. The isolated digest is used to attest or prove the state of the current isolated execution.

The non-volatile memory 160 stores non-volatile information. Typically, the non-volatile memory 160 is implemented in flash memory. The non-volatile memory 160 includes the processor nub 18.

The processor nub 18 provides the initial set-up and low-level management of the isolated area 70 (in the system memory 140), including verification, loading, and logging of the operating system (OS) nub 16, and the management of the symmetric key used to protect the operating system nub's secrets. The processor nub 18 may also provide application programming interface (API) abstractions to low-level security services provided by other hardware. The processor nub 18 may also be distributed by the original equipment manufacturer (OEM) or operating system vendor (OSV) via a boot disk.

The mass storage device 170 stores archive information such as code (e.g., processor nub 18), programs, files, data, applications (e.g., applications $42_1$ to $42_N$), applets (e.g., applets $46_1$ to $46_K$) and operating systems. The mass storage device 170 may include compact disk (CD) ROM 172, floppy diskettes 174, and hard drive 176, and any other magnetic or optic storage devices. The mass storage device 170 provides a mechanism to read machine-readable media.

I/O devices 175 may include any I/O devices to perform I/O functions. Examples of I/O devices 175 include controller for input devices (e.g., keyboard, mouse, trackball, pointing device), media card (e.g., audio, video, graphics), network card, and any other peripheral controllers.

The token bus 180 provides an interface between the ICH 150 and various tokens in the system. A token is a device that performs dedicated input/output functions with security functionalities. A token has characteristics similar to a smart card, including at least one reserved-purpose public/private key pair and the ability to sign data with the private key. Examples of tokens connected to the token bus 180 include a motherboard token 182, a token reader 184, and other portable tokens 186 (e.g., smart card). The token bus interface 159 in the ICH 150 connects through the token bus 180 to the ICH 150 and ensures that when commanded to prove the state of the isolated execution, the corresponding token (e.g., the motherboard token 182, the token 186) signs only valid isolated digest information. For purposes of security, the token should be connected to the digest memory.

When implemented in software, the elements of the present invention are the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Resetting a Processor in an Isolated Execution Environment

Figure 2:
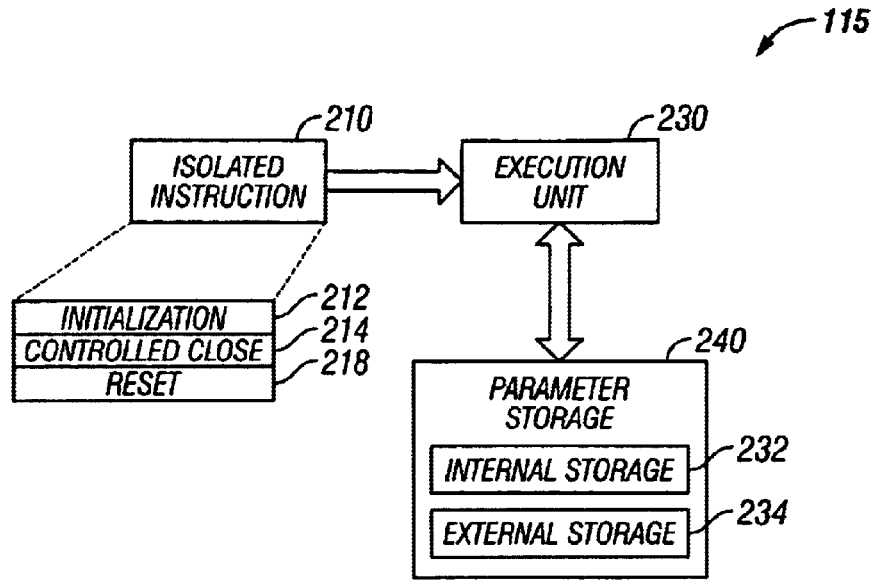
FIG. 2 is a diagram illustrating an architecture for isolated instructions according to one embodiment of the invention.

FIG. 2 is a diagram illustrating a part of the isolated execution circuit 115 shown in FIG. 1C according to one embodiment of the invention. The isolated execution circuit 115 includes an execution unit 230 and a parameter storage 240.

The execution unit 230 executes an isolated instruction in the processor 110, shown in FIG. 1C. As discussed above, the processor 110 operates in a platform including the MCH 130, the system memory 140, the ICH 150, and the token bus 180 as shown in FIG. 1C. In addition, the processor 110 is configured in one of a normal execution mode and an isolated execution mode. The execution unit 230 may include a decoder to decode the isolated instruction, sub execution units to carry out the tasks in the decoded instruction, an arithmetic and logic unit (ALU) to perform arithmetic and logic functions, and associated registers. The execution unit 230 receives an isolated instruction 210.

The isolated instruction 210 may also be a macro instruction, which includes a number of micro-instructions, or assembly language level instructions. The isolated instruction 210 may also be a high level language instruction or a function, routine, subprogram in a high level language. In what follows, the term "instruction" refers to an abstract conception of a task or a function that is executed by the processor 110 (FIG. 1C). This task or function can be accomplished by a single operation, a series of micro-operations, a microcode routine, a macro instruction, an assembly language routine or function, a high level language statement, a high level language subroutine or subprogram or function, or a dedicated hardware circuit.

The isolated instruction 210 includes a number of instructions. In one embodiment, these instructions include an isolated initialization instruction 212, an isolated controlled close instruction 214, and an isolated reset instruction 218. These instructions are used as part of an initialization process, a controlled close process, and a reset process, respectively. These processes will be described in detail later.

The parameter storage 240 contains at least one parameter to support execution of the isolated instruction 210 when the processor 110 is configured in the isolated execution mode. The parameter storage 240 includes an internal storage 232 and an external storage 234. The internal storage 232 is internal to the processor 110 and the external storage 234 is external to the processor 110. The at least one parameter is one of an isolated feature word, an execution mode word, a logical processor value, an isolated setting including a mask value and a base value, a frame, an exit physical address, an entry physical address, and a processor nub loader physical address.

Figure 3:
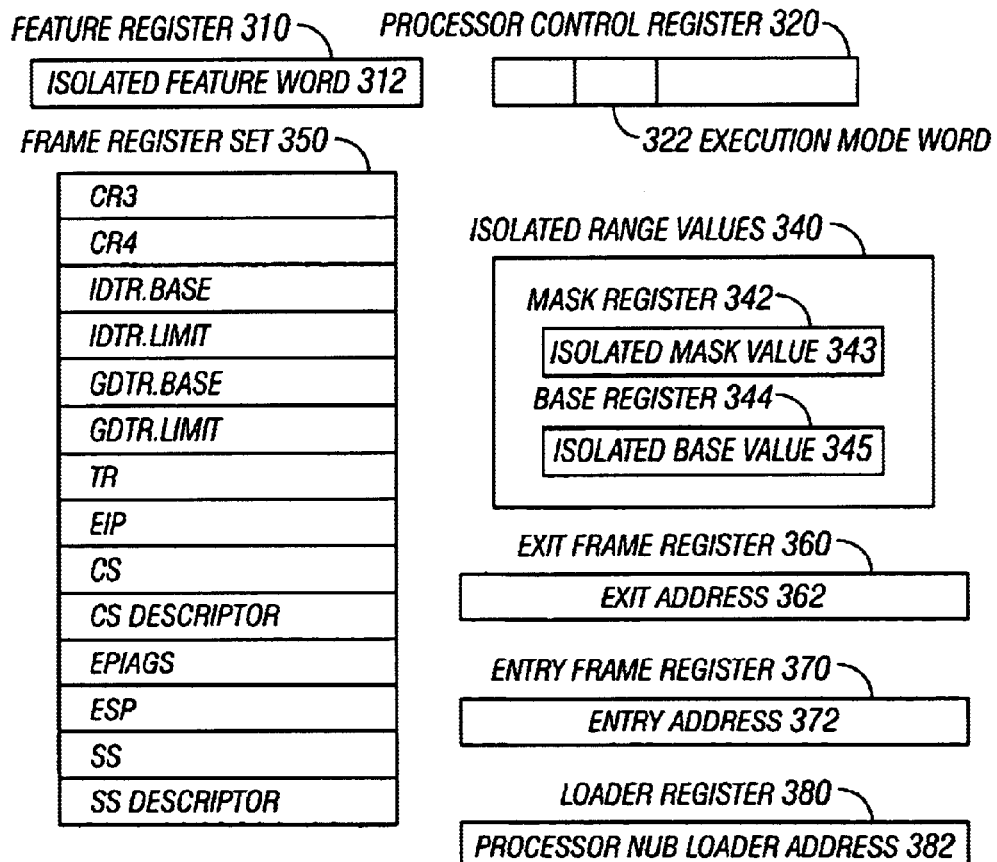
FIG. 3 is a diagram illustrating an internal storage according to one embodiment of the invention.

FIG. 3 is a diagram illustrating the internal storage 232 shown in FIG. 2 according to one embodiment of the invention. The internal storage 232 includes a feature register 310, a processor control register 320, a logical processor register 330, an isolated range values register set 340, a frame register set 350, an exit frame register 360, an entry frame register 370, and a loader register 380.

The feature register 310 stores the isolated feature word. The isolated feature word indicates that the isolated instructions are present in the processor 110 and which features of the isolated instructions are present. Examples of the features may include the type of isolated instructions, a random number, and a random number status. The processor control register 320 stores an execution mode word 322. The execution mode word 322 stores a bit to indicate if the processor is configured in the isolated execution mode. In one embodiment, the execution mode word is accessed only by the instructions that transfer control to or from the isolated execution mode.

The isolated range values register set 340 for the processor stores isolated range values utilizing memory range registers (e.g., base and length registers) to represent the isolated area 70 in the system memory 140 (FIG. 1C). The isolated range values register set 340 includes a mask register 342 and a base register 344. The mask register 342 and base register 344 store the isolated mask value 343 and the isolated base value 345, respectively. The isolated mask value 343 and the isolated base value 345 are used to define the isolated area 70.

The frame register set 350 stores a number of values corresponding to a frame. A frame includes a number of register values that need to be saved or restored when there is an exit out of or entry into an isolated execution mode. Typically these frame values are those values that are necessary to keep track of the state of the processor. In one embodiment, the processor is a Pentium-type. The frame information includes the values of the control register 3 (CR3), control register 4 (CR4), the Interrupt Descriptor Task Register (IDTR) base, IDTR limit, the Global Descriptor Task Register (GDTR) base value, the GDTR limit value, the task register (TR) value, the extended instruction pointer (EIP), the code segment (CS) value, the CS descriptor, the extended flags (EFLAGS), the extended stack pointer (ESP), the stack segment (SS) value, and the SS descriptor. A frame corresponding to an exit out of or entry into an isolated execution mode is referred to an exit frame or an entry frame, respectively.

The exit frame register 360 stores an exit address 362. The exit address 362 is the physical address of the exit frame. The entry frame register 370 stores an entry address 372. The entry address 372 is the physical address of the entry frame. The load register 380 stores a processor nub loader address 382. The processor nub loader address 382 is the physical address of the process nub loader.

Figure 4:
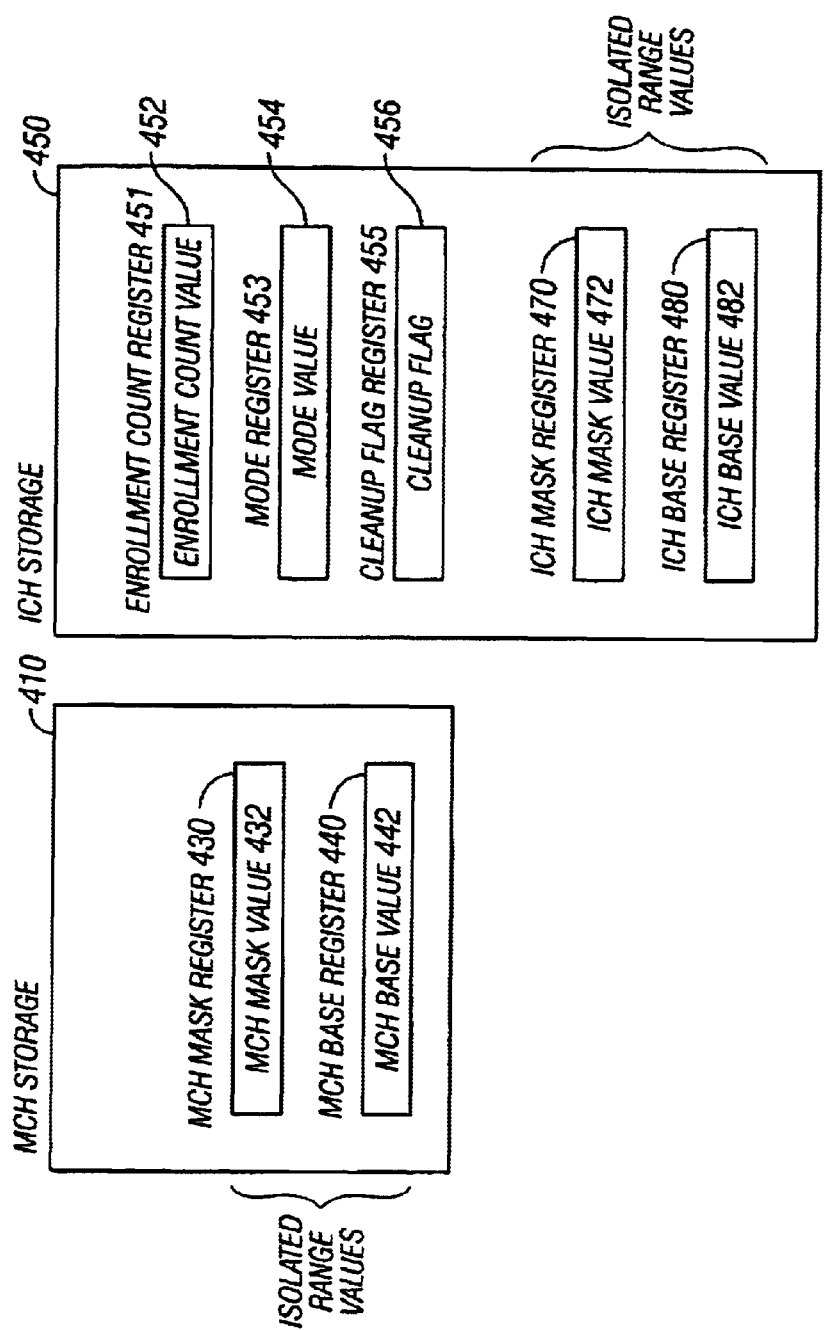
FIG. 4 is a diagram illustrating an external storage according to one embodiment of the invention.

FIG. 4 is a diagram illustrating the external storage 234 shown in FIG. 2 according to one embodiment of the invention. The external storage 234 includes the MCH storage 410 and ICH storage 450.

The MCH storage 410 is in the MCH 130 as part of the Isolated Area Control 135 as shown in FIG. 1C. The MCH storage 410 stores isolated range values utilizing memory range registers (e.g., base and length registers) to represent the isolated area 70 in the system memory 140 (FIG. 1C). The MCH mask register 430 and base register 440 store the MCH mask value 432 and MCH base value $442_1$ respectively. The MCH mask value 432 and the MCH base value 442 are used to define the isolated area 70.

The ICH storage 450 is in the ICH shown in FIG. 1C. The ICH storage 450 includes an enrollment count register 451, a mode register 453, a cleanup flag register 455, an ICH mask register 470, and an ICH base register 480. The enrollment count register 451 stores an enrollment count value 452 (hereinafter enrollment count) which indicates the number of processors that are configured to use the isolated area 70 in the system memory 140 as shown in FIG. 1C. In particular, the processors directly manage the enrollment count register 451. When a processor joins the subsystem (i.e. gains access to the isolated area) via an initialization process, to be discussed later, the processor atomically reads and increments the enrollment count. Alternatively, when a processor leaves the subsystem or is reset (as will be discussed in detail later), the processor decrements the enrollment count.

The mode register 453 stores a mode value 454 designating the current Isolated Execution Mode of the ICH. The mode register 453 is read by a processor during the initialization process. The two mode values checked for during the initialization process are Waiting to Initialize, denoted "waiting", and Processor Nub Initialized, denoted "initialized". It should be appreciated that the mode register may contain other types of mode values (hereinafter mode), as well. The mode is checked during the initialization process to prevent other processors from corrupting the state while an isolated area memory and trusted subsystem are being created. Generally, if the mode is not correct for a given state of the initialization process, the initialization process will be aborted. Further, the mode register 453 can only be cleared by a processor when the enrollment count goes to zero. The mode register can be cleared under the control of a trusted subsystem (e.g. the processor nub or OS nub) by the processor issuing the isolated controlled close instruction.

The cleanup flag register 455 stores a cleanup flag value 456 (hereinafter cleanup flag) that has two states either: set or not set. The flag is set to indicate that the isolated area has been used, and therefore requires "cleaning" before it can disabled and converted to a non-isolated area. The processor nub loader sets the cleanup flag during the trusted initialization of a new isolated area of memory. The cleanup flag can be cleared under the control of a trusted subsystem (e.g. the processor nub or OS nub) by the processor issuing an isolated controlled close instruction.

The ICH storage 450 also stores isolated range values utilizing memory range registers (e.g., base and length registers) to represent the isolated area 70 in the system memory 140 (FIG. 1C). The ICH mask register 470 and base register 480 store an ICH mask value 472 and ICH base value 482, respectively. The ICH mask value 472 and the ICH base value 482 are used to define the isolated area 70. The enrollment count, the mode, the cleanup flag, and the ICH isolated range values, are modifiable during the reset process, the initialization process, the trusted initialization of the new isolated area of memory, and the controlled close process, which will now be discussed in detail.

Figure 5:
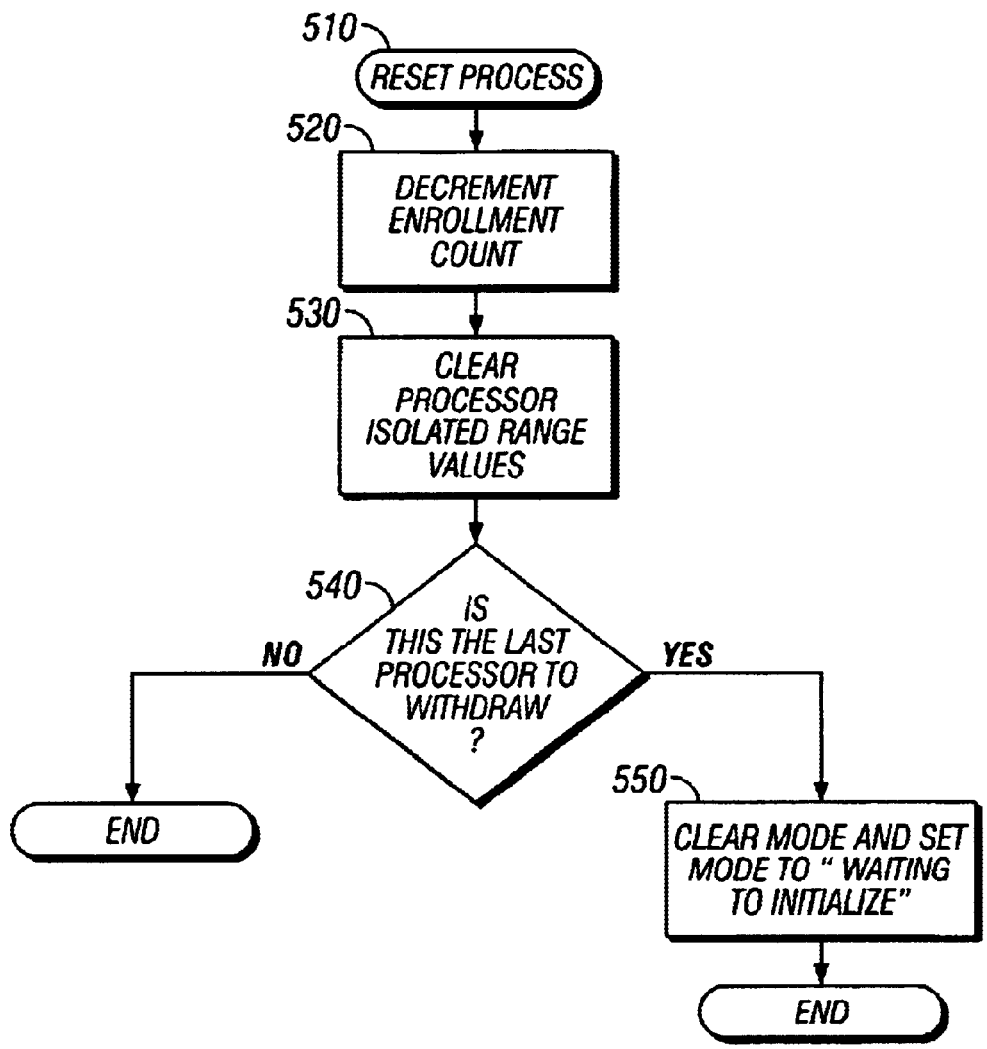
FIG. 5 is a flowchart illustrating a process to individually reset a processor according to one embodiment of the invention.

FIG. 5 is a flowchart illustrating a process to individually reset a processor while preserving the integrity of the isolated execution environment, according to one embodiment of the invention.

One or more processors in the system are individually reset, while the remainder of the system remains unaffected and operational. The reset process (block 510) for individually resetting a processor begins by a processor invoking the reset process in response to the processor being reset. A user may purposely individually reset a processor(s), processor(s) may be individually reset automatically due to some hardware event, or processor(s) may be individually reset in attempted attack by hackers. Such a reset may be applied to a subset of the processors within the system. In this case, the isolated area must remain intact and functioning, while only the reset processors are removed from participating in the isolated area. At block 520, the reset process 510 decrements the enrollment count. At block 530, the reset process 510 clears the reset processor's isolated range values. Next, the reset process 510 determines if this is the last processor to withdraw (block 540). If this is not the last processor to withdraw, the reset process 510 ends. Thus, only the current processor is individually reset and the isolated memory area remains active for other processors that may be utilizing it. An initializing processor can join via the initialization process, to be discussed later, and simply use the already created isolated area of memory already under the control of a trusted subsystem (e.g. the processor nub or OS nub).

However, if this is the last processor to withdraw (block 540), the reset process 510 clears the mode and sets the mode to "waiting to initialize" (block 550). In the case that all the processors are individually reset, such as in a multi-processor environment (e.g. server or workstation), it is assumed that this is an attack by hackers. It is assumed that the hackers are deliberately trying to individually reset all the processors in order to leave information in the isolated area of memory and that they are trying to gain access to this isolated and secure information. At this point, all the processors are withdrawn from the isolated memory area, which, as will be discussed, is marked inactive, but not clean.

Figure 6:
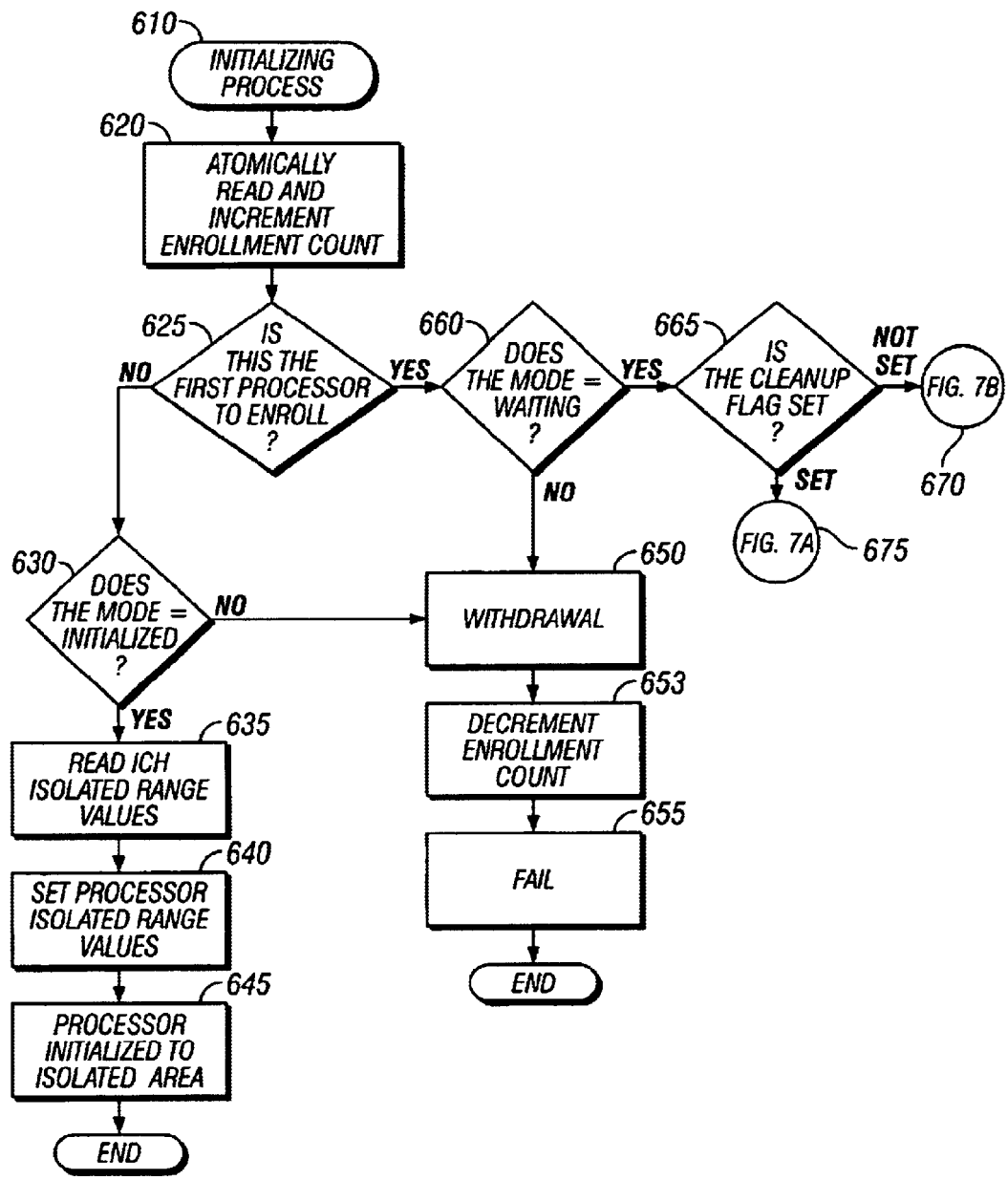
FIG. 6 is a flowchart illustrating an initialization process for a processor according to one embodiment of the invention.
Figure 7A:
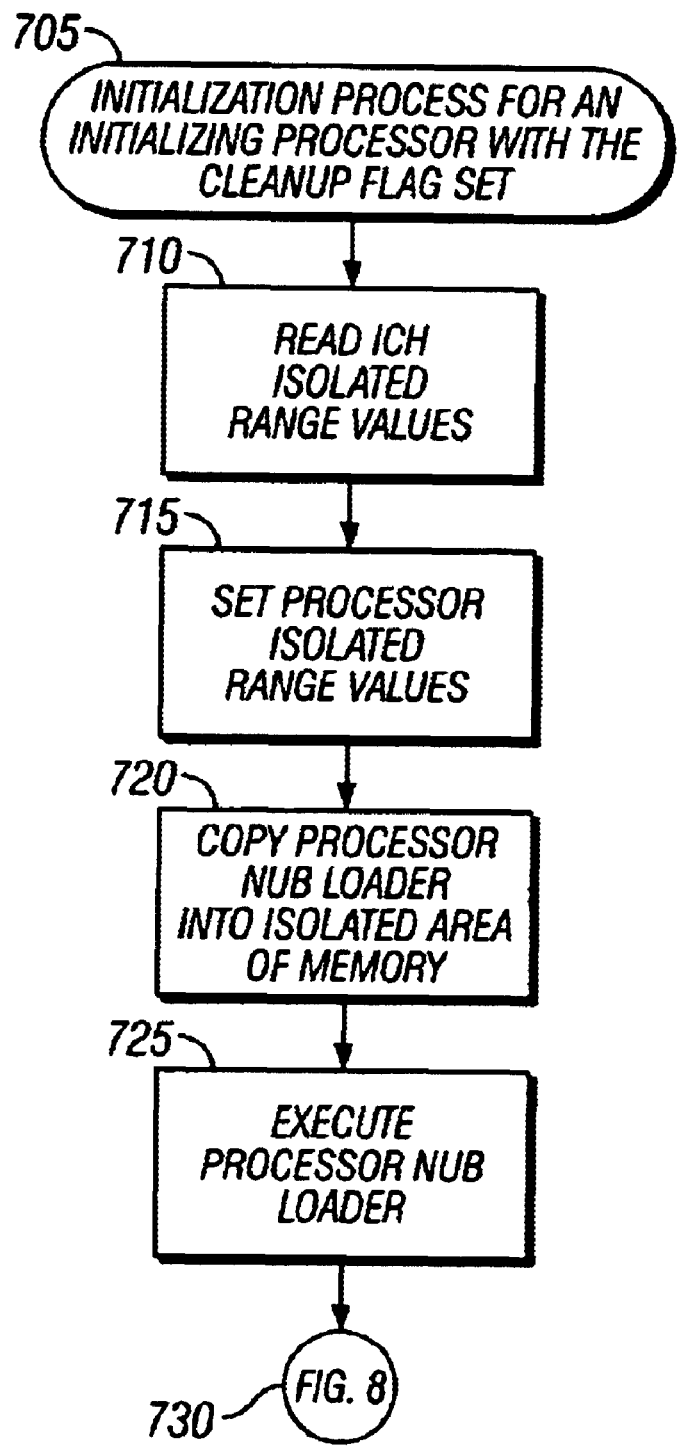
FIG. 7a is a flowchart illustrating an initialization process for an initializing processor with a cleanup flag set according to one embodiment of the invention.
Figure 7B:
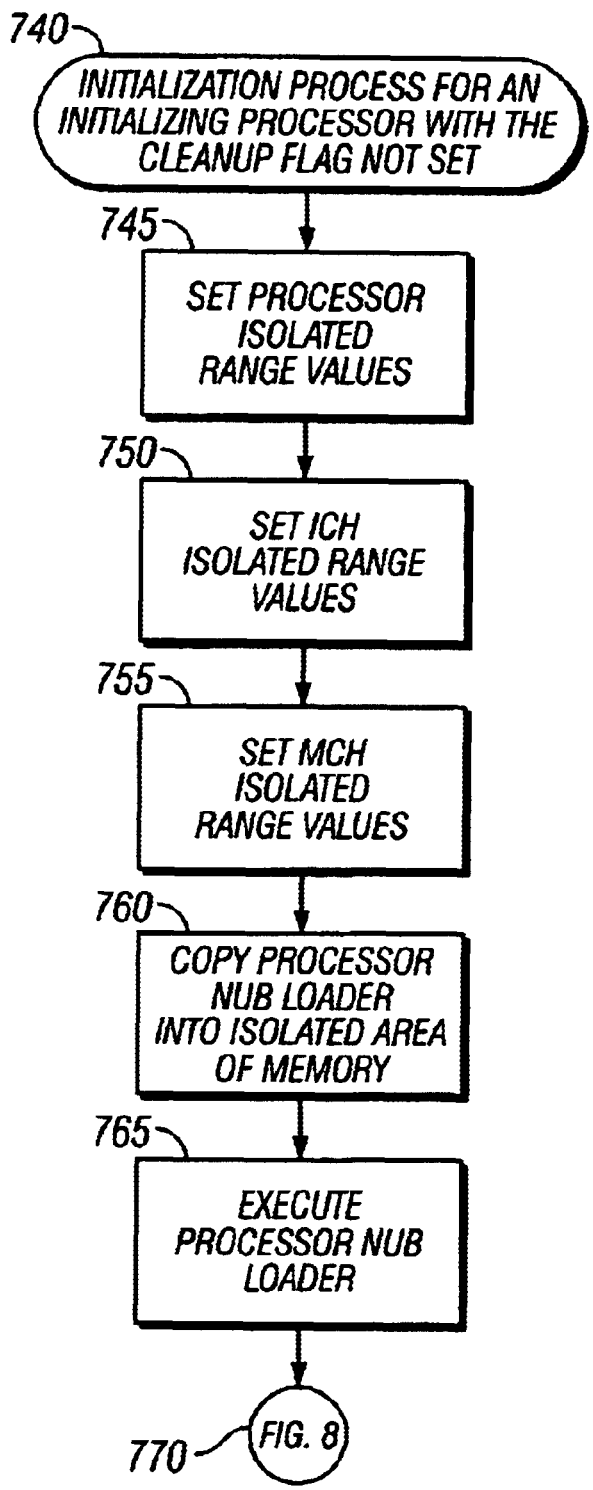
FIG. 7b is a flowchart illustrating an initialization process for an initializing processor with the cleanup flag not set according to one embodiment of the invention.

FIGS. 6, 7a & 7b represent the actions performed automatically, by a single processor instruction (e.g. the isolated initialization instruction). To achieve the integrity and security of the isolated area, and the participating processors, this sequence cannot be interrupted, and must run to completion.

FIG. 6 is a flowchart illustrating an initialization process for a processor according to one embodiment of the invention. This process is invoked to allow an initializing processor to join an existing isolated area, or to create a new isolated memory area.

The initialization process (block 610) begins by an initializing processor atomically reading and updating the enrollment count (block 620). The initialization process 610 then determines whether this is the first processor to enroll (block 625). If this is not the first processor to enroll, the initialization process 610 next determines whether the isolated area mode is set to initialized (block 630). If not, this represents the case where another processor, reset ahead of this one, has already entered the initialization process, and has responsibility for correctly configuring the isolated area. For the current processor, this represents a 'busy' error condition. The initialization process 610 withdraws the processor (block 650) from participating in the isolated area, and decrements the enrollment counter (block 653), and the initialization process 610 fails for that processor (block 655). Thus, the request to create or join the isolated memory area is denied. However, this initialization process may be re-invoked to allow this processor to join the isolated area once it has been re-established.

If the initialization process 610 determines that the mode is set to initialized 630, this represents a processor joining an established isolated area. The initialization process 610 then reads the isolated range values from the ICH (block 635) and sets the processor's isolated range values to those of the ICH (block 640). The initialization process 610 then initializes the processor to use the isolated area of memory (block 645) already under the control of a trusted subsystem (e.g. the processor nub or OS nub). As a result, the processor has joined the existing isolated memory area.

Returning to decision block 625, if this is the first processor to enroll, the initialization process 610 next determines whether the isolated area mode is set to waiting (block 660). If the mode is not set to waiting, this represents an error condition. The initialization process 610 then withdraws the processor (block 650) from participating in the isolated area, decrements the enrollment count (block 653), and the initialization process 610 fails (block 655). Otherwise, the initialization process 610 continues to block 665 which determines whether the cleanup flag is set. If the cleanup flag is set, this represents an attempt to create a new isolated area in a system that retains an old isolated area that was not properly cleaned up. The initialization process 610 then continues to FIG. 7a (block 675), and if the cleanup flag is not set, the initialization process 610 continues to FIG. 7b (block 670).

It should be noted that the processor nub loader sets the cleanup flag during the trusted initialization of a trusted subsystem (e.g. the processor nub) as will be discussed later, and that when the last processor is reset the cleanup flag is not cleared. Thus, after a reset, the cleanup flag is still set indicating to subsequent processors that the subsystem was not properly shutdown, processors may have been reset, and a residual isolated area of memory remains that may contain sensitive information. Therefore, the residual isolated area of memory needs to be scrubbed before a new isolated area of memory is to be created.

FIG. 7a is a flowchart illustrating an initialization process for an initializing processor with a cleanup flag set according to one embodiment of the invention.

The initialization process with the cleanup flag set (block 705) begins by reading the isolated range values from the ICH (block 710) and setting the processor isolated range values to those of the ICH (block 715) thus configuring the processor to re-use the prior isolated area. Next, the initialization process 705 copies the processor nub loader into the isolated area of memory (block 720) and executes the processor nub loader (725). The initialization process 705 then proceeds to the trusted initialization described in FIG. 8 (block 730). Thus, the pre-existing isolated memory area is reloaded with the processor nub loader.

FIG. 7b is a flowchart illustrating an initialization process for an initializing processor with the cleanup flag not set according to one embodiment of the invention.

The initialization process with the cleanup flag not set (block 740) begins by setting the isolated range values of the processor (block 745), the ICH (block 750), and the MCH (block 755) to that of a new isolated area of memory. Next, the initialization process 740 copies the processor nub loader into the isolated area of memory (block 760) and executes the processor nub loader (block 765). The initialization process 740 then proceeds to the trusted initialization of the new isolated area of memory under the control of a trusted subsystem described in FIG. 8 (block 730). As a result, a new isolated memory area is created that is ready to load the processor nub.

Figure 8:
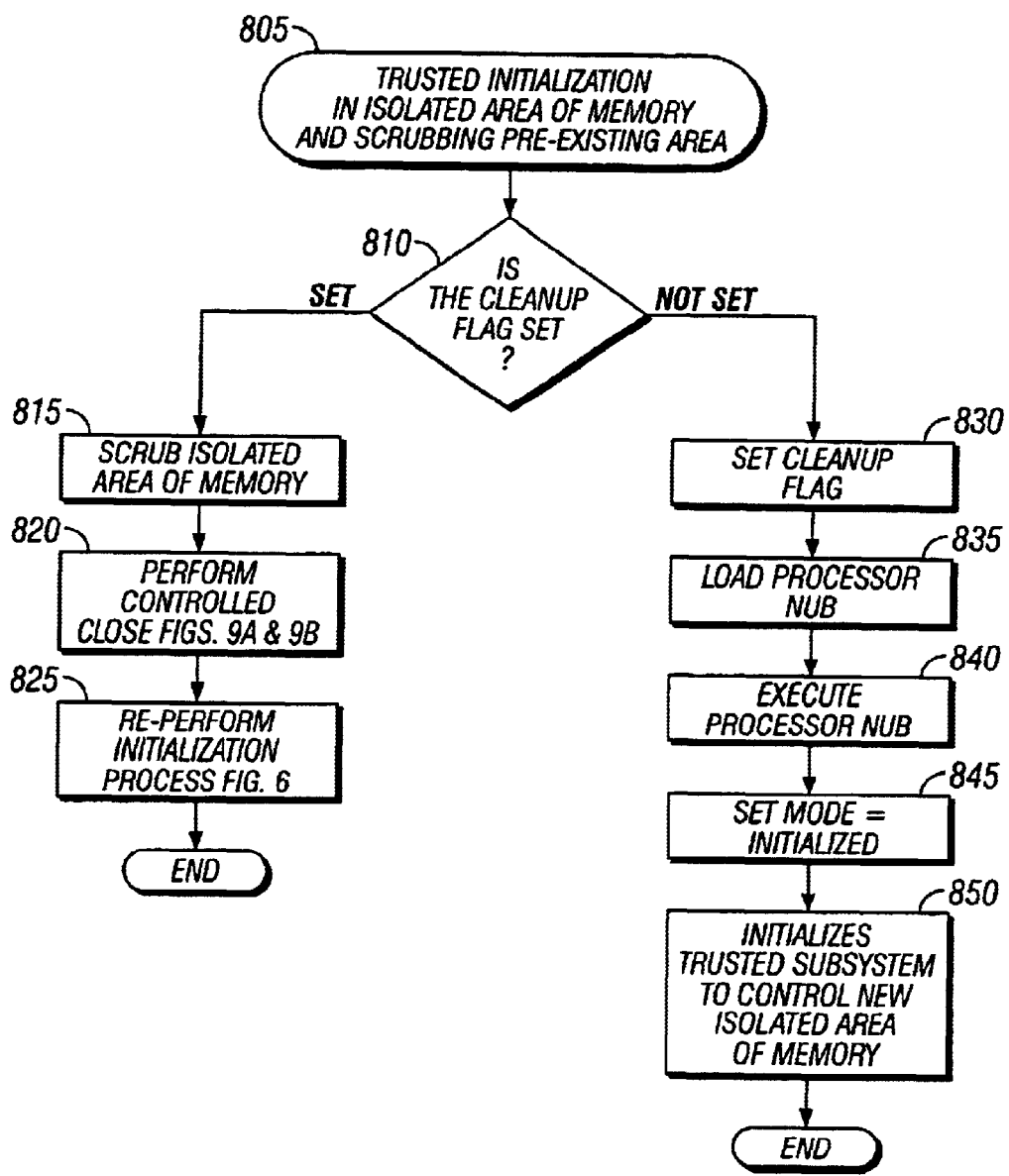
FIG. 8 is a flowchart illustrating a process for performing a trusted initialization of a new isolated area of memory for an initializing processor under the control of a trusted subsystem according to one embodiment of the invention.

FIG. 8 is a flowchart illustrating a process for performing a trusted initialization of a new isolated area of memory for an initializing processor under the control of a trusted subsystem according to one embodiment of the invention. FIG. 8 also illustrates the scrubbing of a pre-existing isolated memory area.

The process for performing a trusted initialization of the new isolated area of memory (block 805) begins by determining whether the cleanup flag is set (block 810). If the cleanup flag is not set, this represents the case where there is no remnant of a prior isolated area requiring cleanup. The trusted initialization process 805 then sets the cleanup flag (block 830). Next, the trusted initialization process 805 loads the processor nub (block 835) and executes the processor nub (block 840). The trusted initialization process 805 then sets the mode to initialized (block 845). Lastly, the trusted initialization process 805 initializes the trusted subsystem (e.g. the processor nub itself or the OS Nub) to control the new isolated area of memory for the initializing processor and platform.

On the other hand, if the cleanup flag is set (block 810), this represents the case where a prior isolated area was not completely shut down. The trusted initialization process 805 then scrubs the isolated area of memory (block 815) and initiates a controlled close (block 820). The controlled close process will be described in FIGS. 9a and 9b. After performing the controlled close, the trusted initialization process 805 forces the processor to re-perform the initialization process of FIG. 6 (block 825). Although in this embodiment the processor nub loader performs the functions of block 815, 820, and 825, in alternative embodiments, the processor nub can performs these functions. Thus, the pre-existing isolated memory area is scrubbed and the initialization process is re-performed.

Figure 9A:
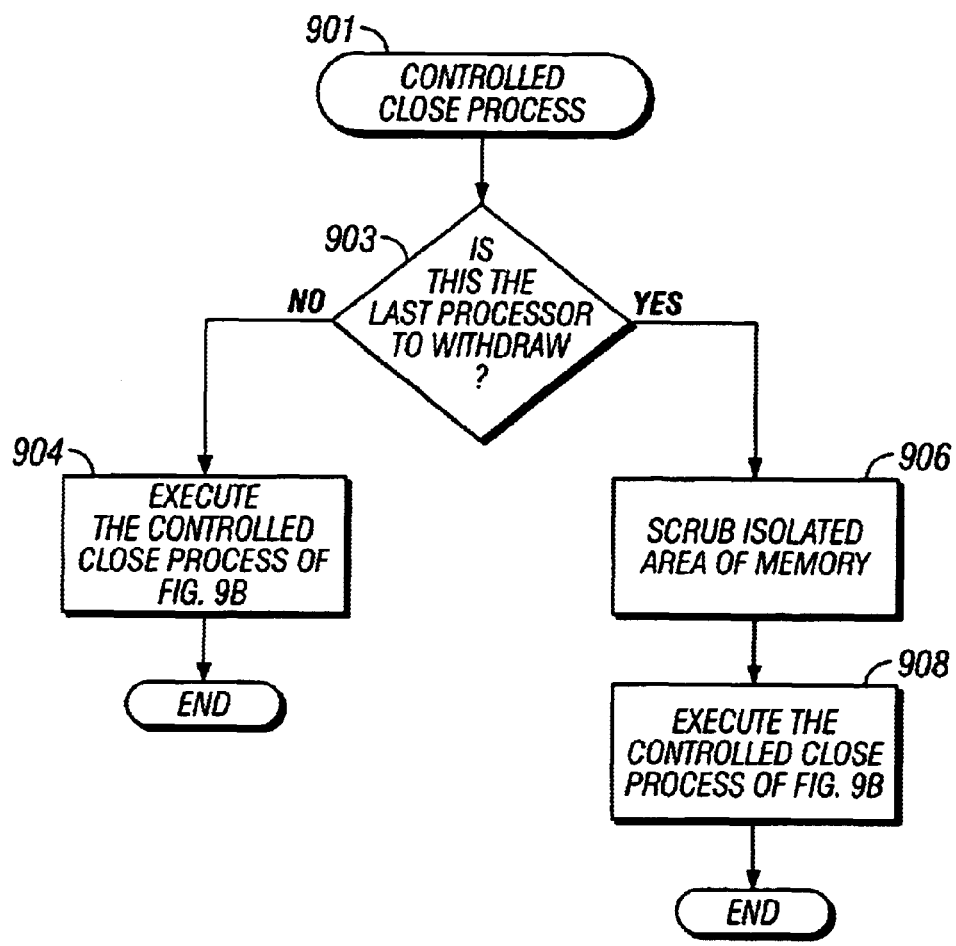
FIG. 9a is a flowchart illustrating a process for performing a controlled close of an isolated memory area according to one embodiment of the invention.

FIG. 9a is a flowchart illustrating a process for performing a controlled close of the isolated memory area according to one embodiment of the invention. This process closes down the isolated memory area in a controlled fashion.

The controlled process (block 901) is performed by an execution ring-0 component (e.g. the processor nub or the OS nub). The controlled close process 901 determines if this is the last processor to withdraw (block 903). If not, the controlled close process 901 executes the controlled close process of FIG. 9b (block 904).

Figure 9B:
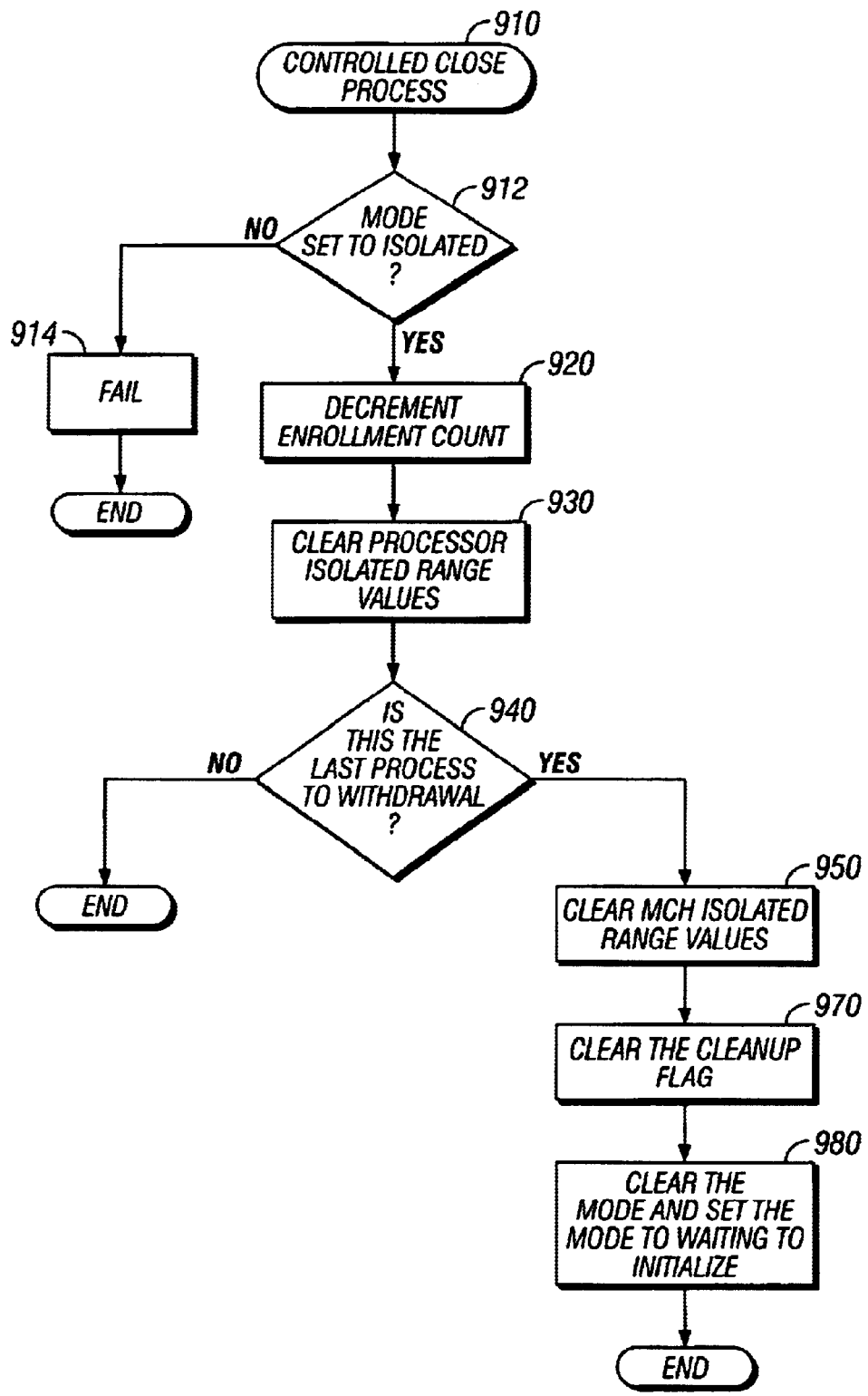
FIG. 9b is a flowchart further illustrating the process for performing a controlled close of FIG. 9a according to one embodiment of the invention.

On the other hand, if this is the last processor to withdraw, the controlled close process 901 first scrubs the isolated area of memory (block 906) and then executes the controlled close process of FIG. 9b (block 908).

FIG. 9b is a flowchart further illustrating the process for performing a controlled close of the isolated memory area of FIG. 9a according to one embodiment of the invention.

The controlled close process (block 910) begins by determining whether the processor execution mode is set to isolated (block 912). If not, the controlled close process fails (block 914) and the process is terminated. If the mode is set to isolated then the controlled close process 910 atomically reads and decrements the enrollment count (block 920). Next, the controlled close process 910 clears the isolated range values of the processor (block 930). Then, the controlled close process 910 determines if this is the last processor to withdraw (block 940). If this is not the last processor to withdraw, the controlled close process 910 ends. As a result, the processor is withdrawn from the isolated memory area, but the isolated area remains active.

On the other hand, if this is the last processor to withdraw, the controlled close process clears 910 the isolated range values in the MCH (block 950). Further, the controlled close process 910 clears the cleanup flag (block 970) and clears the mode and sets the mode to "waiting to initialize" (block 980). As a result, the isolated memory area is shut down. The controlled close process 910 is then terminated.

With reference to the FIGS. 5–9, as previously discussed, an exemplary case will now be discussed. Assuming a last processor of a plurality of processor is individually reset, the cleanup flag is set and the mode is set to waiting, an initializing processor is the first to enroll, and starting at block 665 of FIG. 6, the initialization process 610 for the initializing processor would proceed as follows. At block 665, the initialization process 610 determines that the cleanup flag is set and proceeds to FIG. 7a.

As illustrated in FIG. 7a, the initializing processor first reads the isolated range values from the ICH (block 710) that define the isolated area of memory associated with the reset processor. The initialization process 705 then sets the initializing processor's internal isolated range values to those of the ICH (block 715) and copies the processor nub loader into the isolated area of memory (block 720). The initialization process 705 next invokes the execution of the processor nub loader (block 730). The initialization process 705 then proceeds to FIG. 8 (block 730).

In FIG. 8, the trusted initialization process 805 determines at block 810 that the cleanup flag is set and the processor nub loader scrubs the isolated area of memory (block 815) and invokes a controlled close, shown in FIGS. 9a and 9b, for the initializing processor (block 820). The controlled close process (block 901) of FIG. 9a begins by determining that this is the last processor to withdraw (block 903) and by scrubbing the isolated memory area (block 906). The controlled close process 910 of FIG. 9b clears the isolated range values of the initializing processor (block 930), clears the isolated range values in the MCH (block 950), and clears the cleanup flag (block 970), and clears the mode and sets the mode to "waiting to initialize" (block 980). The trusted initialization process 805 of FIG. 8 then forces the initializing processor to re-perform the initialization process (block 825) of FIG. 6.

Upon the second iteration of the initialization process 610, the initialization process 610 determines that the initializing processor is the first processor to enroll (block 625), the mode is set to waiting (block 660) and the cleanup flag is not set (block 665), such that the initialization process 610 proceeds to FIG. 7b (block 670). In FIG. 7b, the initialization process with the cleanup flag not set 740 creates a new isolated area of memory for the initializing processor. The initialization process 740 sets the isolated range values of the processor (block 745), the ICH (block 750), and the MCH (block 755) to that of a new isolated area of memory. Next, the initialization process 740 copies the processor nub loader into the isolated area of memory (block 760) and executes the processor nub loader (block 765). The initialization process 740 then proceeds to the trusted initialization of the new isolated area of memory under the control of a trusted subsystem described in FIG. 8 (block 770).

In FIG. 8, the trusted initialization process 805 determines that the cleanup flag is not set (block 810). The trusted initialization process 805 then sets the cleanup flag (block 830), loads the processor nub (835), and executes the processor nub (840). Also, the trusted initialization process 805 sets the mode to initialized (block 845). Lastly, the trusted initialization process 805 initializes a trusted subsystem (e.g. the processor nub itself or the OS Nub) to control the new isolated area of memory for the initializing processor and platform.

Thus, when a last processor is reset due to some hardware event, and sensitive information is left behind in the isolated area of memory, the cleanup flag is not cleared. When an initializing processor is initialized, the initialization process determines that the Cleanup flag has been set. The initialization process for the initializing processor scrubs the isolated area of memory, invokes a controlled close, and then re-performs the initialization process such that the initializing processor is initialized with a clean isolated area of memory and a trusted subsystem. Advantageously, any sensitive information left behind in the previous isolated area of memory has been scrubbed so that it is inaccessible.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   invoking a reset process in response to a processor being individually reset, a reset processor operating within a platform in an isolated execution mode and associated with an isolated area of memory;
   invoking an initialization process for an initializing processor, wherein the initializing processor communicates with a memory controller hub (MCH), the MCH having isolated range values, which correspond to the isolated area of memory;
   determining whether a cleanup flag is set; and
   if the cleanup flag is set,
   scrubbing the isolated area of memory.

2. The method of claim 1 wherein the initialization process for the initializing processor in which the cleanup flag is set further comprises clearing the cleanup flag and creating a new isolated area of memory.

3. The method of claim 1 wherein if the cleanup flag is not set during the initialization process for the initializing processor a new isolated area of memory is created.

4. The method of claim 1 wherein the initializing processor utilizes the isolated area of memory associated with the reset processor.

5. The method of claim 1 wherein the reset processor is a last processor of a plurality of processors to be reset.

6. The method of claim 1 wherein the initializing processor is a first processor to enroll in the initialization process.

7. The method of claim 1 wherein the initialization process for the initializing processor in which the cleanup flag is set further comprises:
   reading an isolated range value from an input/output controller hub (ICH) corresponding to the isolated area of memory previously associated with the reset processor;
   setting an isolated range value of the initializing processor to the isolated range value of the ICH; and
   copying a processor nub loader into the isolated area of memory.

8. The method of claim 7 wherein the processor nub loader scrubs the isolated area of memory.

9. The method of claim 7 wherein the initializing processor undergoes a controlled close clearing the cleanup flag.

10. The method of claim 9 wherein the initialization process further comprises creating a new isolated area of memory for the initializing processor.

11. The method of claim 10 wherein creating the new isolated area of memory for the initializing processor comprises:
   setting a new isolated range value for the initializing processor;
   setting a new isolated range value in the ICH;

setting a new isolated range value in a memory controller hub (MCH);

copying the processor nub loader into the new isolated area of memory; and executing the processor nub loader.

12. The method of claim 10 wherein the initialization process further comprises initializing the new isolated area of memory for the platform.

13. A The method of claim 10 wherein the initialization process further comprises initializing the new isolated area of memory for a plurality of other processors.

14. An apparatus comprising:

a processor invoking a reset process in response to the processor being individually reset, a reset processor operating within a platform in an isolated execution mode and associated with an isolated area of memory; and an initializing processor invoking an initialization process, the initialization process determining whether a cleanup flag is set, wherein the initializing processor communicates with a memory controller hub (MCH), the MCH having isolated range values, which correspond to the isolated area of memory; and if the cleanup flag is set, the initialization process invokes a processor nub loader to scrub the isolated area of memory.

15. The apparatus of claim 14 wherein if the cleanup flag is set the initialization process clears the cleanup flag and creates a new isolated area of memory.

16. The apparatus of claim 14 wherein if the cleanup flag is not set the initialization process creates a new isolated area of memory.

17. The apparatus of claim 14 wherein the initializing processor utilizes the isolated area of memory associated with the reset processor.

18. The apparatus of claim 14 wherein the reset processor is a last processor of a plurality of processors to be reset.

19. The apparatus of claim 14 wherein the initializing processor is a first processor to enroll in the initialization process.

20. The apparatus of claim 14 wherein if the cleanup flag is set the initialization process:

reads an isolated range value from an input/output controller hub (ICH) corresponding to the isolated area of memory previously associated with the reset processor;

sets an isolated range value of the initializing processor to the isolated range value of the ICH; and copies a processor nub loader into the isolated area of memory.

21. The apparatus of claim 20 wherein the processor nub loader scrubs the isolated area of memory.

22. The apparatus of claim 20 wherein the initializing processor performs a controlled close clearing the cleanup flag.

23. The apparatus of claim 22 wherein the initialization process creates a new isolated area of memory.

24. The apparatus of claim 23 wherein the initialization process creates the new isolated area of memory by:

setting a new isolated range value within the initializing processor;

setting a new isolated range value in the ICH;

setting a new isolated range value in a memory controller hub (MCH);

copying the processor nub loader into the new isolated area of memory; and executing the processor nub loader.

25. The apparatus of claim 23 wherein the new isolated area of memory is initialized for the platform.

26. The apparatus of claim 23 wherein the new isolated area of memory is initialized for a plurality of other processors.

27. A computer program product comprising:

a machine readable medium having computer code stored therein, the computer program product comprising:

computer readable program code for invoking a reset process in response to a processor being individually reset, a reset processor operating within a platform in an isolated execution mode and associated with an isolated area of memory;

computer readable program code for invoking an initialization process for an initializing processor, wherein the initializing processor communicates with a memory controller hub (MCH), the MCH having isolated range values, which correspond to the isolated area of memory;

computer readable program code for determining whether a cleanup flag is set; and if the cleanup flag is set, scrubbing the isolated area of memory.

28. The computer program product of claim 27 wherein the computer readable program code for performing the initialization process for the initializing processor, when the cleanup flag is set, further comprises:

computer readable program code for clearing the cleanup flag; and computer readable program code for creating a new isolated area of memory.

29. The computer program product of claim 27 wherein the computer readable program code for performing the initialization process for the initializing processor, when the cleanup flag is not set, further comprises computer readable program code for creating a new isolated area of memory.

30. The computer program product of claim 27 further comprising computer readable program code for allowing the initializing processor to utilize the isolated area of memory associated with the reset processor.

31. The computer program product of claim 27 wherein the reset processor is a last processor of a plurality of processors to be reset.

32. The computer program product of claim 27 wherein the initializing processor is a first processor to enroll in the initialization process.

33. The computer program product of claim 27 wherein the computer readable program code for performing the initialization process for the initializing processor, when the cleanup flag is set, further comprises:

computer readable program code for reading an isolated range value from an input/output controller hub (ICH) corresponding to the isolated area of memory previously associated with the reset processor;

computer readable program code for setting an isolated range value of the initializing processor to the isolated range value of the ICH; and computer readable program code for copying a processor nub loader into the isolated area of memory.

34. The computer program product of claim 33 further comprising computer readable program code for allowing the processor nub loader to scrub the isolated area of memory.

35. The computer program product of claim 33 further comprising computer readable program code for performing a controlled close upon the initializing processor and clearing the cleanup flag.

36. The computer program product of claim 35 wherein the computer readable program code for initializing the initializing processor further comprises computer readable program code for creating a new isolated area of memory for the initializing processor.

37. The computer program product of claim 36 wherein the computer readable program code for creating the new isolated area of memory for the initializing processor further comprises:

computer readable program code for setting a new isolated range value for the initializing processor;

computer readable program code for setting a new isolated range value in the ICH;

computer readable program code for setting a new isolated range value in a memory controller hub (MCH);

computer readable program code for copying the processor nub loader into the new isolated area of memory; and computer readable program code for executing the processor nub loader.

38. The computer program product of claim 36 further comprising computer readable program code for initializing the new isolated area of memory for the platform.

39. The computer program product of claim 36 further comprising computer readable program code for initializing the new isolated area of memory for the platform.

40. A system comprising:

a chipset;

a memory coupled to the chipset having an isolated area of memory;

a processor coupled to the chipset and the memory operating in a platform, the processor invoking a reset process in response to the processor being individually reset, a reset processor operating in an isolated execution mode and associated with the isolated area of memory; and an initializing processor invoking an initialization process, the initialization process determining whether a cleanup flag is set, wherein the initializing processor communicates with a memory controller hub (MCH), the MCH having isolated range values, which correspond to the isolated area of memory; and if the cleanup flag is set,
the initialization process invokes a processor nub loader to scrub the isolated area of memory.

41. The system of claim 40 wherein if the cleanup flag is set the initialization process clears the cleanup flag and creates a new isolated area of memory.

42. The system of claim 40 wherein if the cleanup flag is not set the initialization process creates a new isolated area of memory.

43. The system of claim 40 wherein the initializing processor utilizes the isolated area of memory associated with the reset processor.

44. The system of claim 40 wherein the reset processor is a last processor of a plurality of processors to be reset.

45. The system of claim 40 wherein the initializing processor is a first processor to enroll in the initialization process.

46. The system of claim 40 wherein if the cleanup flag is set the initialization process:

reads an isolated range value from an input/output controller hub (ICH) corresponding to the isolated area of memory previously associated with the reset processor;

sets an isolated range value of the initializing processor to the isolated range value of the ICH; and copies a processor nub loader into the isolated area of memory.

47. The system of claim 46 wherein the processor nub loader scrubs the isolated area of memory.

48. The system of claim 46 wherein the initializing processor performs a controlled close clearing the cleanup flag.

49. The system of claim 48 wherein the initialization process creates a new isolated area of memory.

50. The system of claim 49 wherein the initialization process creates the new isolated area of memory by:

setting a new isolated range value within the initializing processor;

setting a new isolated range value in the ICH;

setting a new isolated range value in a memory controller hub (MCH);

copying the processor nub loader into the new isolated area of memory; and executing the processor nub loader.

51. The system of claim 49 wherein the new isolated area of memory is initialized for the platform.

52. The system of claim 49 wherein the new isolated area of memory is initialized for a plurality of other processors.

* * * * *

UNITED STATES PATENT AND TRADEMARK OFFICE
CERTIFICATE OF CORRECTION

PATENT NO. : 6,754,815 B1
DATED : June 22, 2004
INVENTOR(S) : Ellison et al.

It is certified that error appears in the above-identified patent and that said Letters Patent is hereby corrected as shown below:

Column 1,
Line 23, delete "modem" and insert -- modern --.

Column 7,
Line 7, delete "$142_1$" and insert -- 142, --.

Column 10,
Line 65, delete "$442_1$" and insert -- 442, --.

Signed and Sealed this

Seventh Day of September, 2004

JON W. DUDAS
*Director of the United States Patent and Trademark Office*